(12) United States Patent
Ichikawa

(10) Patent No.: US 9,118,844 B2
(45) Date of Patent: Aug. 25, 2015

(54) IMAGING APPARATUS, IMAGE PROCESSING APPARATUS, AND IMAGING METHOD FOR PROVIDING A SPECIAL EFFECT SUPERIMPOSING STILL IMAGE DATA ON MOVING IMAGE DATA

(71) Applicant: Olympus Imaging Corp., Shibuya-ku, Tokyo (JP)

(72) Inventor: Manabu Ichikawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 38 days.

(21) Appl. No.: 13/936,153

(22) Filed: Jul. 6, 2013

(65) Prior Publication Data

US 2013/0293733 A1 Nov. 7, 2013

Related U.S. Application Data

(63) Continuation of application No. PCT/JP2012/054316, filed on Feb. 22, 2012.

(30) Foreign Application Priority Data

May 25, 2011 (JP) .................................. 2011-116919

(51) Int. Cl.
*H04N 5/262* (2006.01)
*H04N 5/232* (2006.01)
*H04N 5/77* (2006.01)
(Continued)

(52) U.S. Cl.
CPC .............. *H04N 5/2621* (2013.01); *G06T 11/00* (2013.01); *H04N 1/212* (2013.01); *H04N 5/23245* (2013.01); *H04N 5/772* (2013.01); *H04N 9/8042* (2013.01); *H04N 9/8047* (2013.01); *H04N 9/8205* (2013.01); *G11B 2020/10537* (2013.01); *H04N 5/91* (2013.01); *H04N 9/7921* (2013.01);
(Continued)

(58) Field of Classification Search
USPC .......................................... 348/220.1, 333.05
See application file for complete search history.

(56) References Cited

U.S. PATENT DOCUMENTS 7,626,617 B2 * 12/2009 Terada ........................... 348/239
2006/0182436 A1 8/2006 Tabuchi
(Continued)

FOREIGN PATENT DOCUMENTS

| JP | 9-0191427 | 7/1997 |
|----|-----------|--------|
| JP | 2001-45409 | 2/2001 |

(Continued)

OTHER PUBLICATIONS

PCT/ISA/210 for PCT/JP2012/054316, Mar. 27, 2012.
PCT/ISA/237 for PCT/JP2012/054316, Mar. 27, 2012.

*Primary Examiner* — Albert Cutler
(74) *Attorney, Agent, or Firm* — John C. Pokotylo; Straub & Pokotylo

(57) ABSTRACT

An image processing unit performs image processing with respect to image data. A still image information storage unit stores still image data in accordance with an instruction from a still image shooting instruction unit. A moving image recording unit records moving image data in accordance with an instruction from a moving image shooting instruction unit. The timing information acquisition unit acquires timing information. The image processing unit performs special effect image processing of combining the still image data to image data associated with the timing information in the pieces of image data constituting the moving image data.

20 Claims, 15 Drawing Sheets

(51) Int. Cl.
*H04N 1/21* (2006.01)
*G06T 11/00* (2006.01)
*H04N 9/804* (2006.01)
*H04N 9/82* (2006.01)
*H04N 9/79* (2006.01)
*G11B 20/10* (2006.01)
*H04N 101/00* (2006.01)
*H04N 5/91* (2006.01)

(52) U.S. Cl.
CPC .... *H04N 2101/00* (2013.01); *H04N 2201/3215* (2013.01)

(56) References Cited

U.S. PATENT DOCUMENTS

2008/0259174 A1\* 10/2008 Nagao ................. 348/220.1
2011/0025865 A1\* 2/2011 Kunishige et al. ......... 348/220.1

FOREIGN PATENT DOCUMENTS

| | | |
|---|---|---|
| JP | 2004-312218 | 11/2004 |
| JP | 2006-222771 | 8/2006 |
| JP | 2010-114729 | 5/2010 |
| JP | 2011-35486 | 2/2011 |

\* cited by examiner

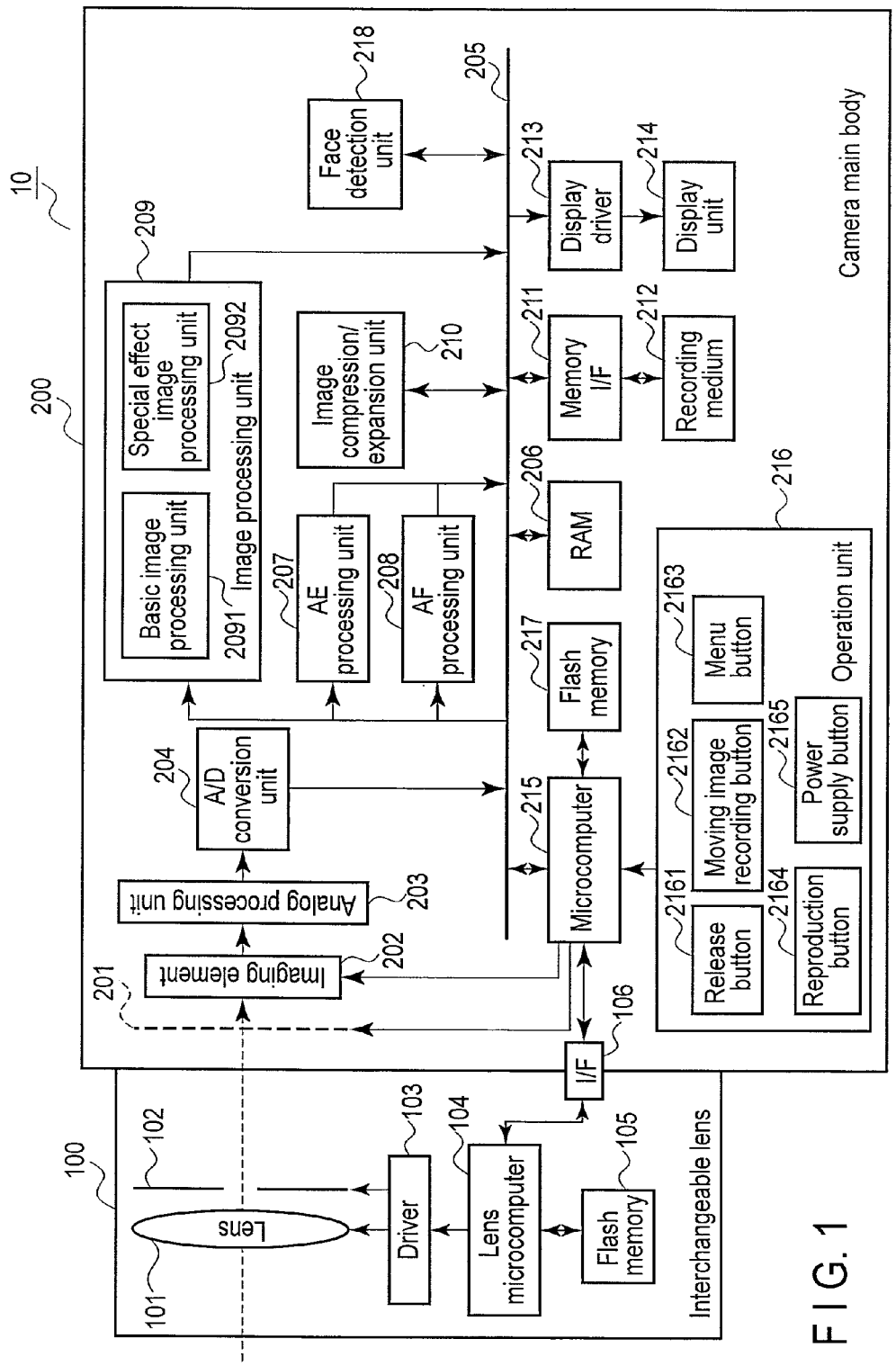
F I G. 1

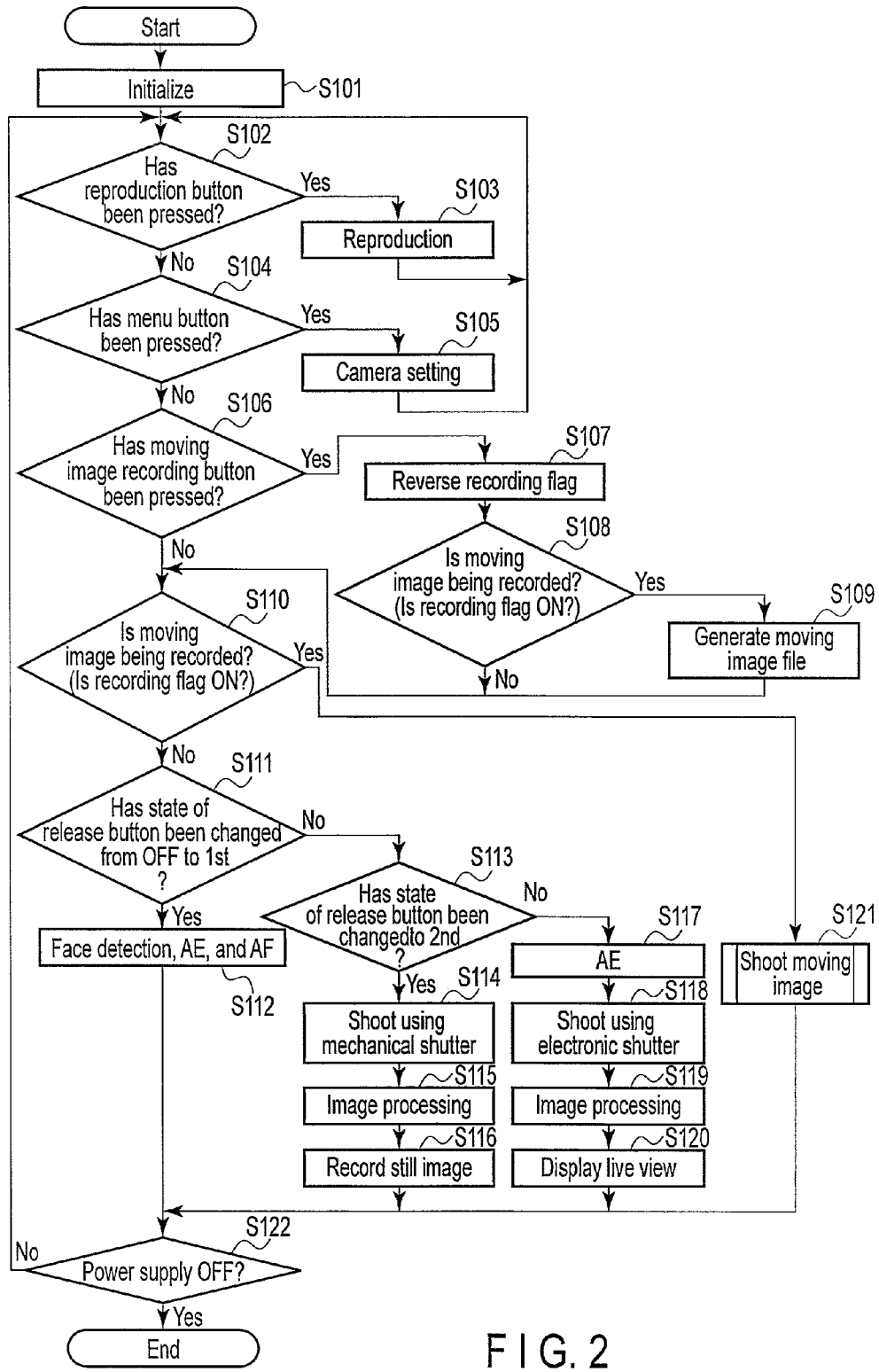
F I G. 2

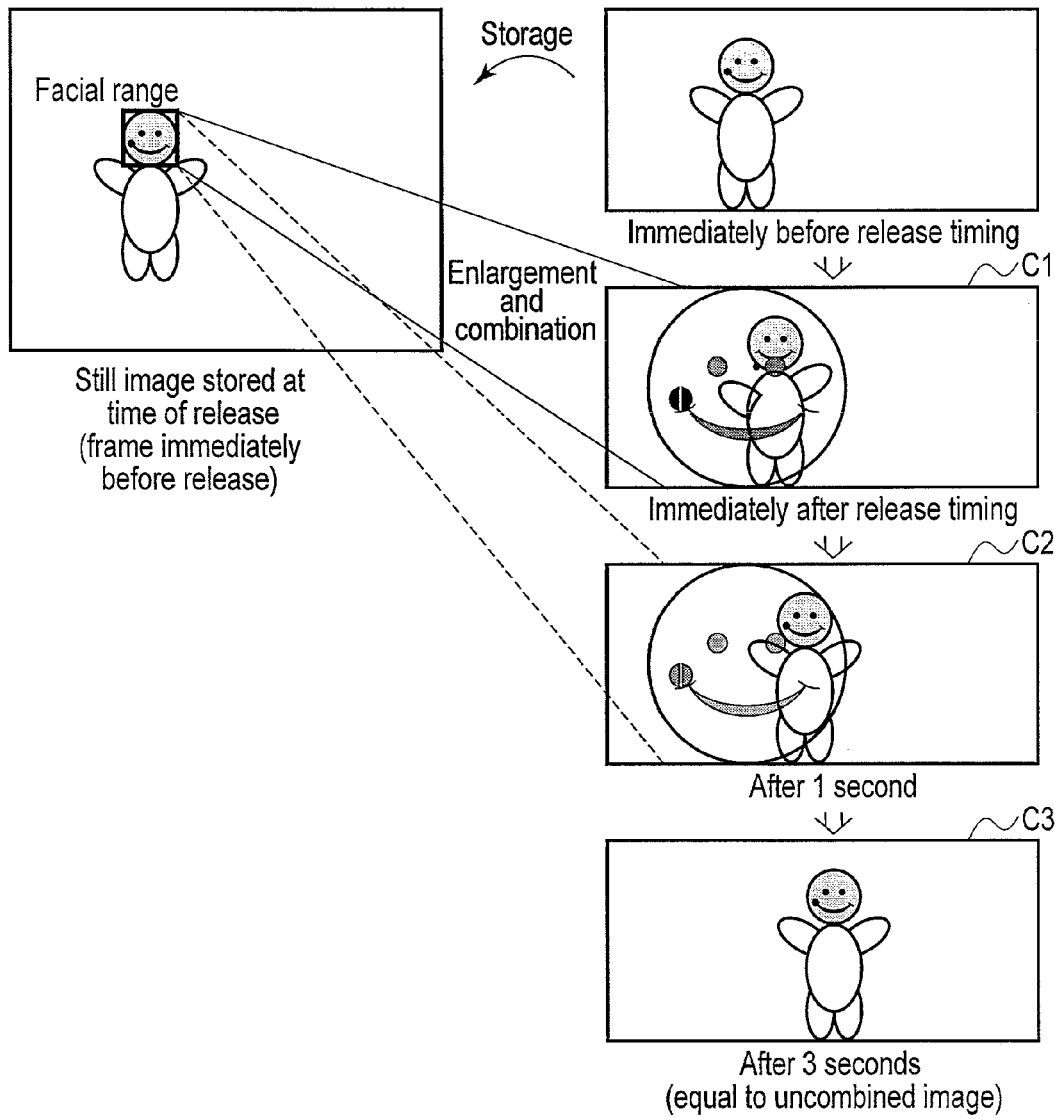
F I G. 6

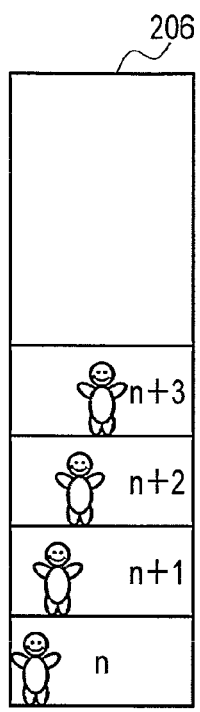
FIG. 8A
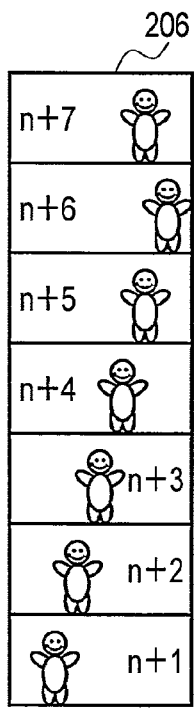
FIG. 8B
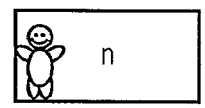
→ Record in file

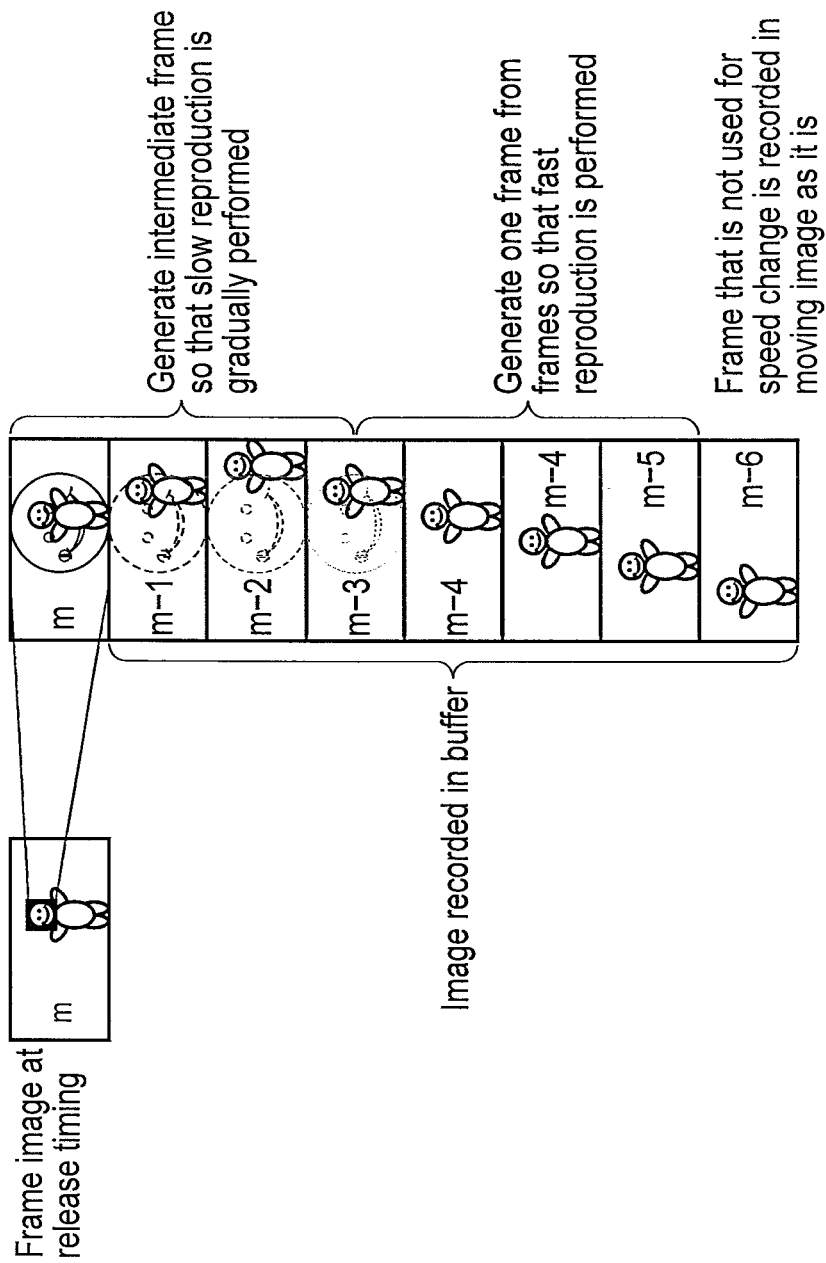
F I G. 11

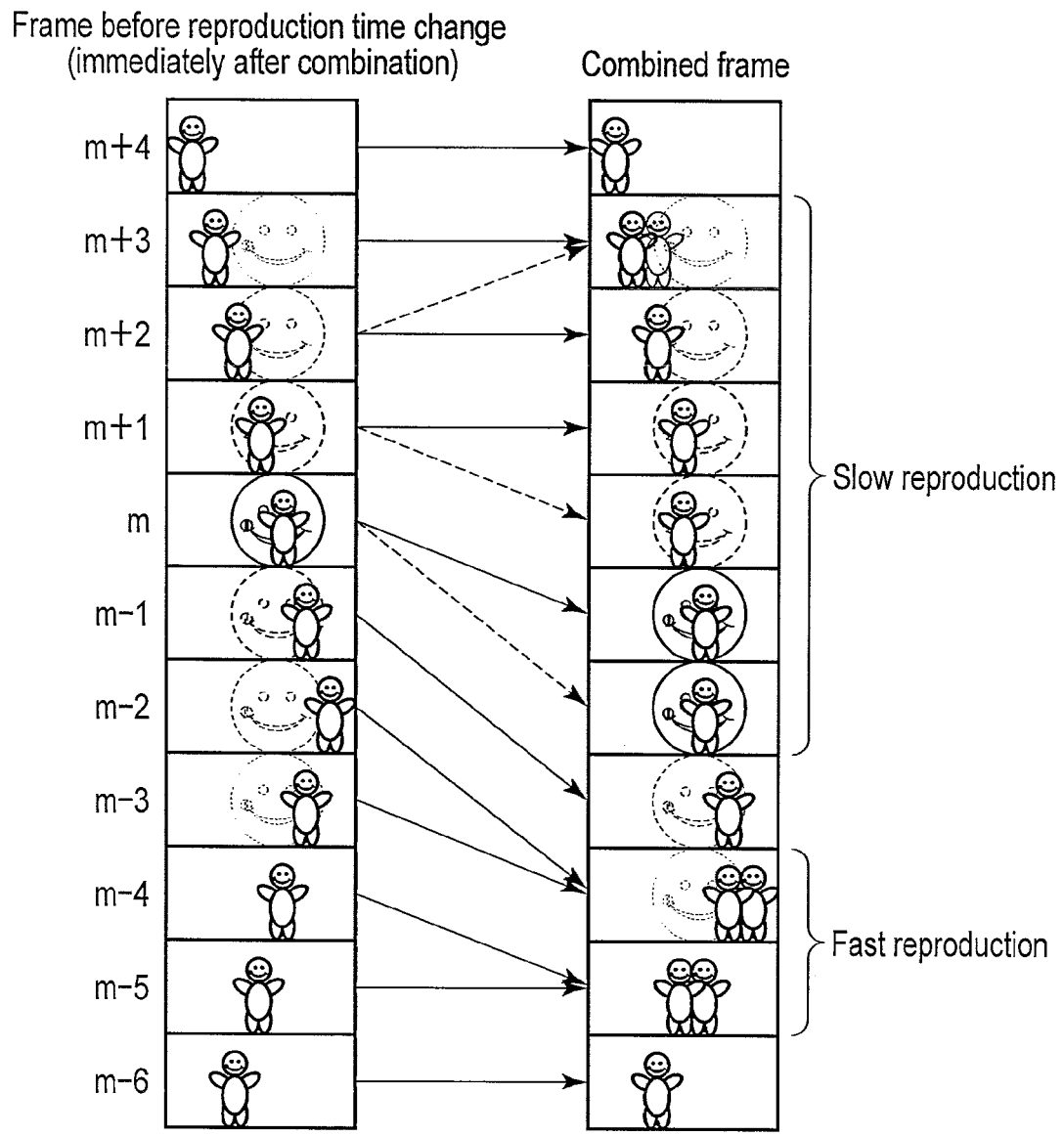
F I G. 12

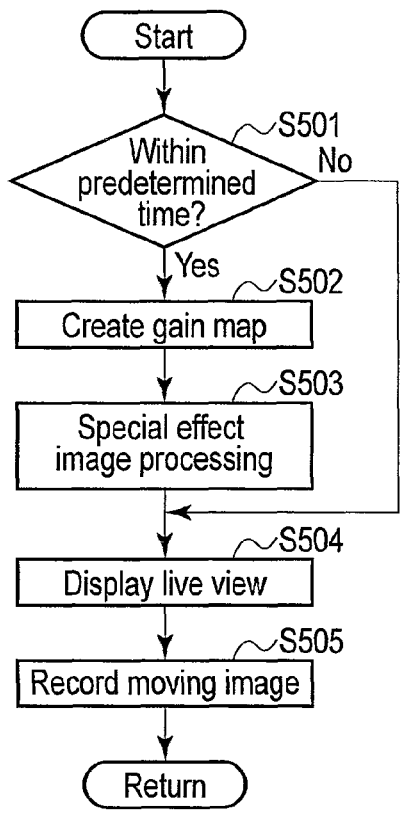
F I G. 13
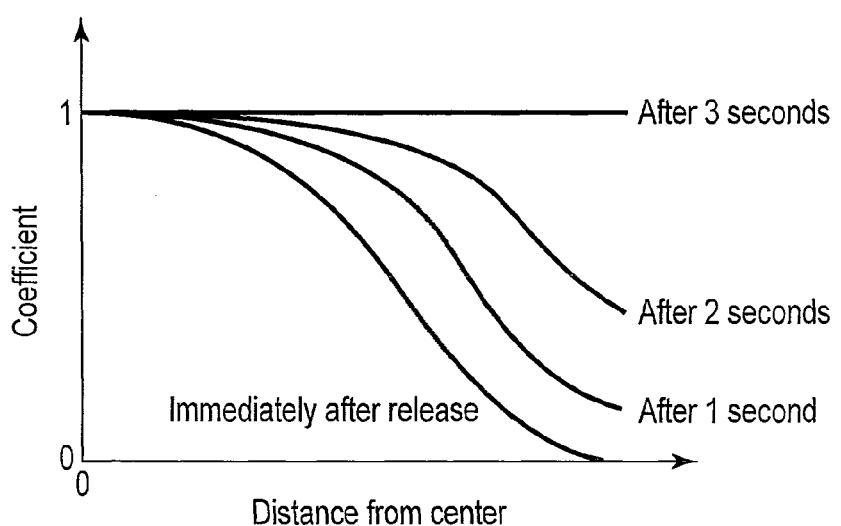
F I G. 14

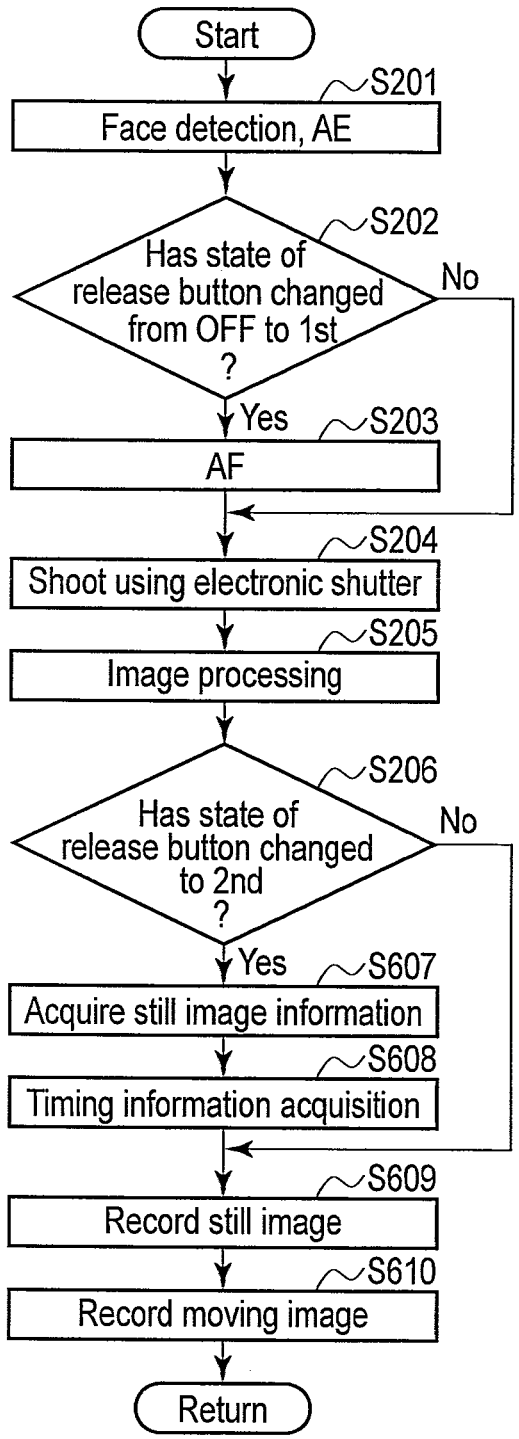
F I G. 16

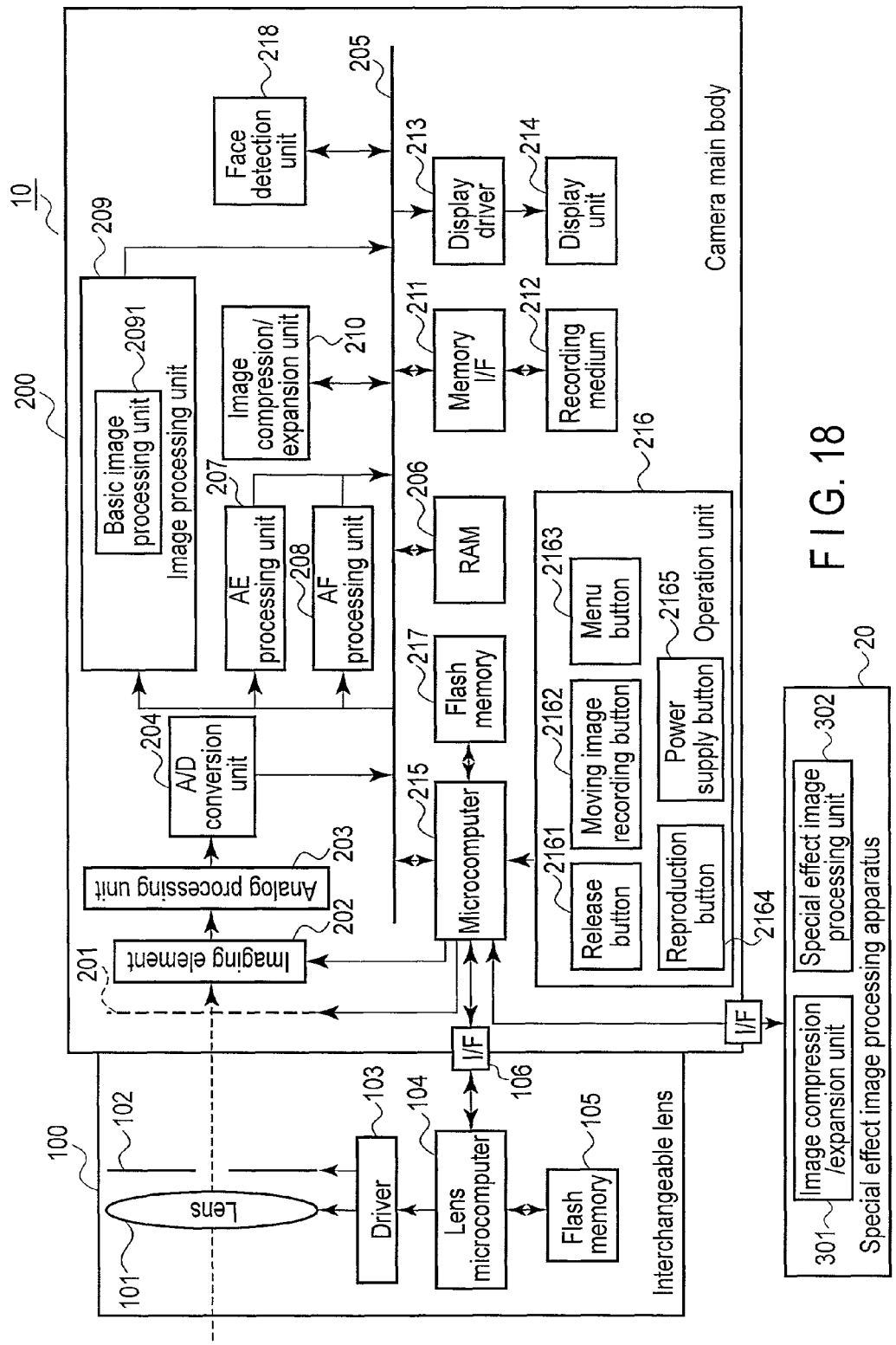
F I G. 18

IMAGING APPARATUS, IMAGE PROCESSING APPARATUS, AND IMAGING METHOD FOR PROVIDING A SPECIAL EFFECT SUPERIMPOSING STILL IMAGE DATA ON MOVING IMAGE DATA

CROSS-REFERENCE TO RELATED APPLICATIONS

This application is a Continuation Application of PCT Application No. PCT/JP2012/054316, filed Feb. 22, 2012 and based upon and claiming the benefit of priority from prior Japanese Patent Application No. 2011-116919, filed May 25, 2011, the entire contents of all of which are incorporated herein by reference.

BACKGROUND OF THE INVENTION

1. Field of the Invention

The present invention relates to an imaging apparatus that performs special effect image processing to a moving image, an image processing apparatus, and an imaging method.

2. Description of the Related Art

In recent years, an imaging apparatus such as a digital camera can shoot not only still images but also moving images. In such an imaging apparatus, for example, when a moving image shooting instructing portion (a moving image button) provided for shooting moving images is operated, moving images can be readily shot. For example, Jpn. Pat. Appln. KOKAI Publication No. 2001-45409 has made a suggestion concerning an imaging apparatus that can perform both still image shooting and moving image shooting. In Jpn. Pat. Appln. KOKAI Publication No. 2001-45409, when a still image shooting instruction is issued by using a still image release switch (a still image shooting instructing portion) during moving image shooting, a still image flag is added to a still image obtained at a timing that the instruction was issued. Further, in Jpn. Pat. Appln. KOKAI Publication No. 2001-45409, the still image having the still image flag added thereto is reproduced concurrently with reproduction of a moving image at the time of reproduction of the moving image.

Furthermore, there has been suggested a technology that gives special visual effects by performing image processing to an image to be reproduced. For example, in Jpn. Pat. Appln. KOKAI Publication 2010-114729, shading is applied by image processing.

BRIEF SUMMARY OF THE INVENTION

According to a first aspect of the invention, an imaging apparatus comprises: an imaging unit which images a subject and obtains image data; an image processing unit which performs image processing with respect to the image data obtained by the imaging unit; a still image shooting instruction unit configured to instruct the imaging unit to execute still image shooting; a still image information storage unit which stores still image information including: still image data obtained by using the image processing unit to perform image processing to the image data acquired by the imaging unit in accordance with an instruction from the still image shooting instruction unit; and accompanying information of the still image data; a moving image shooting instruction unit configured to instruct the imaging unit to execute moving image shooting; a moving image recording unit which records moving image data obtained by using the image processing unit to perform image processing to the pieces of image data obtained by the imaging unit in accordance with an instruction from the moving image shooting instruction unit; and a timing information acquisition unit which acquires timing information indicative of a timing at which an executing instruction of the still image shooting was issued when the still image shooting instruction unit has instructed to execute the still image shooting during execution of the moving image shooting, wherein the image processing unit performs special effect image processing, which is configured to execute processing of combining the still image data to image data associated with the timing information in the pieces of image data constituting the moving image data, with respect to the moving image data during execution of the moving image shooting based on the still image information stored in the still image information storage unit and the timing information acquired by the timing information acquisition unit, and the moving image recording unit further records moving image data subjected to the special effect image processing during execution of the moving image shooting.

According to a second aspect of the invention, an imaging method comprising: instructing an imaging unit to execute moving image shooting by a moving image shooting instruction unit; imaging a subject and obtaining pieces of image data by the imaging unit in accordance with an instruction from the moving image shooting instruction unit; performing image processing with respect to the pieces of image data obtained by the imaging unit and acquiring moving image data by an image processing unit; instructing the imaging unit to execute still image shooting by a still image shooting instruction unit during execution of the moving image shooting; storing still image data obtained by using the image processing unit to perform the image processing to the image data acquired by the imaging unit and accompanying information of the still image data in a still image data storage unit in accordance with an instruction from the still image shooting instruction unit; obtaining timing information indicative of a timing at which an execution instruction of the still image shooting was issued by a timing information acquisition unit in accordance with an instruction from the still image shooting instruction unit; performing special effect image processing, which is configured to combine the still image data with image data associated with the timing information in the pieces of image data constituting the moving image data, by the image processing unit with respect to the moving image data during execution of the moving image shooting based on the still image information stored in the still image information storage unit and the timing information acquired by the timing information acquisition unit; and recording moving image data subjected to the special effect image processing in a moving image recording unit during execution of the moving image shooting.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a configuration of a digital camera as an example of an imaging apparatus according to each embodiment of the present invention;

FIG. 2 is a flowchart showing a main operation of the digital camera;

FIG. 6 is a view for explaining an example of the combining processing;

FIG. 8A is a view showing an example of circulating storage of image data and also showing an example of storage of first to seventh image data;

FIG. 8B is a view showing an example of circulating storage of image data and also showing an example of storage of eighth and subsequent image data;

FIG. 11 is a view for explaining generation of past frame;

FIG. 12 is a view for explaining generation of current frame;

FIG. 13 is a flowchart showing an example of processing of step S209 in FIG. 3 in a third embodiment according to the present invention;

FIG. 14 is a view showing an example of a gain map;

FIG. 16 is a flowchart showing detail of moving image shooting processing in a fourth embodiment according to the present invention;

FIG. 18 is a block diagram showing a configuration of a modification in which a special effect image processing apparatus is provided with a special effect image processing unit.

DETAILED DESCRIPTION OF THE INVENTION

Figure 3:
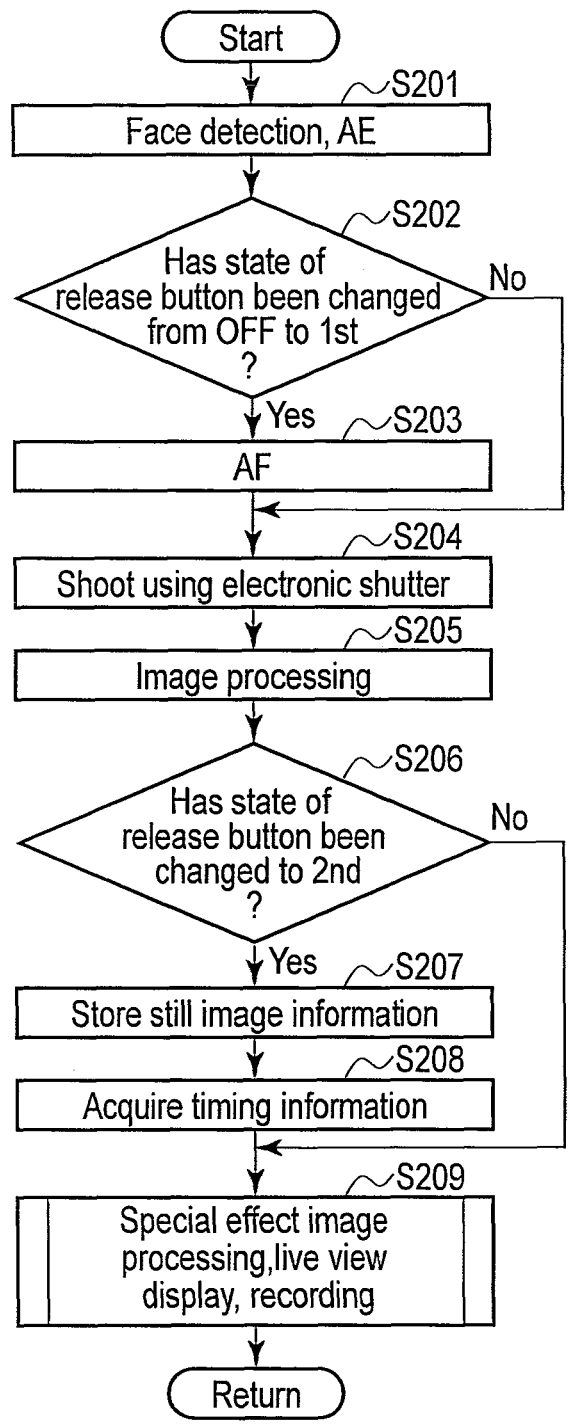
FIG. 3 is a flowchart showing detail of moving image shooting processing in a first embodiment according to the present invention.

Embodiments according to the present invention will now be described hereinafter with reference to the drawings.

First Embodiment

FIG. 1 is a block diagram showing a configuration of a digital camera as an example of an imaging apparatus according to each embodiment of the present invention. A digital camera 10 shown in FIG. 1 is a digital camera with interchangeable lenses. However, the digital camera 10 does not necessary have to be the digital camera with interchangeable lenses, and it may be a digital camera with an integrated lens.

The digital camera 10 shown in FIG. 1 includes an interchangeable lens 100 and a camera main body 200. The interchangeable lens 100 is configured to be attachable to/detachable from the camera main body 200. When the interchangeable lens 100 is attached to the camera main body 200, the interchangeable lens 100 is connected to enable connection with the camera main body 200. As a result, the interchangeable lens 100 can operate under control of the camera main body 200.

The interchangeable lens 100 comprises a lens 101, a diaphragm 102, a driver 103, a lens microcomputer 104, and a flash memory 105.

The lens 101 is an optical system configured to condense a luminous flux from a non-illustrated subject onto an imaging element 202 in the camera main body 200. This lens 101 includes lenses such as a focus lens, a zoom lens, and others.

The diaphragm 102 is configured to be freely opened or closed, and it adjusts an amount of luminous flux that has entered through the lens 101. The driver 103 includes a motor and other parts. This driver 103 drives the focus lens or the zoom lens in the lens 101 along its optical axis direction or drives the diaphragm 102 to be opened/closed under control of the lens microcomputer 104.

When the interchangeable lens 100 is attached to the camera main body 200, the lens microcomputer 104 is connected to a microcomputer 215 in the camera main body 200 through an interface (I/F) 106 so that it can freely communicate with the microcomputer 215. The lens microcomputer 104 drives the driver 103 under control of the microcomputer 215. Further, the lens microcomputer 104 transmits lens information of the interchangeable lens 100 stored in the flash memory 105 to the microcomputer 215 through the I/F 106.

The flash memory 105 stores lens information such as aberration information of the lens 101 and a program or the like required to execute operations of the interchangeable lens 100.

The camera main body 200 comprises a mechanical shutter 201, an imaging element 202, an analog processing unit 203, an analog/digital (A/D) conversion unit 204, a bus 205, a RAM 206, an AE processing unit 207, an AF processing unit 208, an image processing unit 209, an image compression/expansion unit 210, a memory interface (I/F) 211, a storage medium 212, a display driver 213, a display unit 214, a microcomputer 215, an operation unit 216, a flash memory 217, and a face detection unit 218.

The mechanical shutter 201 is movably configured so that a photoelectric conversion surface of the imaging element 202 is light-shielded or exposed. When this mechanical shutter 201 is moved, an exposure time of the imaging element 202 can be adjusted.

The imaging element 202 has the photoelectric conversion surface on which a luminous flux from a subject condensed through the lens 101 is entered. The photoelectric conversion surface is configured by two-dimensionally arranging pixels. Furthermore, a color filter is provided on a light incidence side of the photoelectric conversion surface. Such an imaging element 202 converts an image (a subject image) associated with a luminous flux entered on the photoelectric conversion surface into an electrical signal (which will be referred to as an image signal hereinafter) associated with a light amount thereof and outputs the converted signal.

As the imaging element 202, imaging elements adopting various configurations such as a CCD system or a CMOS system have been known. Further, in regard to color arrangement of the color filter, various kinds of arrangement, such as Bayer arrangement, are known. In this embodiment, a configuration of the imaging element 202 is not restricted to a specific configuration, and imaging elements having various configurations can be adopted. It is desirable for the imaging element 202 to have an electronic shutter function for electronically controlling an exposure time. In the following description, the imaging element 202 is assumed to have the electronic shutter function.

The analog processing unit 203 executes analog processing such as correlative double sampling (CDS) processing or automatic gain control (AGC) processing with respect to an image signal obtained by the imaging element 202. The A/D conversion unit 204 converts the image signal subjected to analog processing in the analog processing unit 203 into a digital signal (which will be referred to as image data hereinafter).

The imaging element 202, the analog processing unit 203, and the A/D conversion unit 204 function as an example of an imaging unit.

The bus 205 is a transfer path through which various kinds of data generated in the camera main body 200 are transferred. The RAM 206 is a storage unit configured to temporarily store various kinds of data generated in the camera main body 200. This RAM 206 functions as an example of a still image information storage unit. The RAM 206 is, e.g., a DRAM.

The AE processing unit 207 calculates subject luminance by using image data. The subject luminance may be not only calculated from image data but also obtained by measurement using, e.g., a dedicated photometric sensor. The AF processing unit 208 extracts a signal indicative of a high-frequency component from image data, integrates the extracted signal indicative of a high-frequency component, and acquires a focusing evaluation value for AF.

The image processing unit 209 executes various kinds of image processing for image data. The image processing unit 209 in this embodiment includes a basic image processing unit 2091 and a special effect image processing unit 2092.

The basic image processing unit 2091 executes basic image processing required for display or recording to image data. This basic image processing includes, e.g., optical black subtraction processing, white balance correction processing, color matrix arithmetic operation processing, gamma conversion processing, edge enhancement processing, and noise reduction processing. The basic image processing unit 2091 also executes resizing processing and other processing.

The optical black subtraction processing is processing for eliminating a dark current component (optical black) of image data by subtracting a dark current component from the image data. The white balance correction processing is processing for multiplying a gain required to correct a color balance of image data. The color matrix arithmetic operation processing is processing for executing a matrix arithmetic processing for adjusting a hue and saturation of image data. The gamma conversion processing is processing for converting gradation characteristics of image data into predetermined characteristics. The edge enhancement processing is processing for enhancing an edge (outline) component in image data. The noise reduction processing is processing for reducing a noise component in image data. The resizing processing is processing for performing interpolation so that image data can be expanded or reduced to a desired size.

Furthermore, synchronization processing may be further required as the basic image processing depending on the color arrangement of the color filter. The synchronization processing is processing for converting image data comprised of one pixel associated with one color component into image data comprised of one pixel associated with more than one color component.

The special effect image processing unit 2092 executes special effect image processing, which provides an image with special visual effects, with respect to image data. This special effect image processing includes, e.g., shading addition processing, a blurring addition processing, soft focus processing, and image combining processing.

The shading addition processing is processing for adding shading (shadow) to an image. The blurring addition processing is processing for adding blurring to a region excluding a subject region in an image. The soft focus processing is processing for adding blurring to an entire image. The image combining processing is processing for combining pieces of image data and producing one new image data.

The image compression/expansion unit 210 executes still image compression processing, of a JPEG system and the like or moving image compression processing of an MPEG system and the like to image data obtained by the image processing executed in the image processing unit 209 at the time of recording an image. Furthermore, the image compression/expansion unit 210 executes expansion (decoding) processing with respect to compressed image data at the time of reproducing an image.

The memory I/F 211 is an interface used when the microcomputer 215 or the like accesses the recording medium 212. The recording medium 212 is, e.g., a memory card that is attachable to or detachable from the camera main body 200. This recording medium 212 records an image file and other data. The image file is a file having header information added to image data compressed by the image compression/expansion unit 210. The recording medium 212 functions as an example of a moving image recording unit.

The display driver 213 converts image data obtained by the image processing unit 209 or image data expanded by the image compression/expansion unit 210 into a video signal and outputs this video signal to the display unit 214. The display unit 214 is, e.g., a liquid crystal display (LCD). This display unit 214 displays an image based on the video signal input from the display driver 213.

The microcomputer 215 comprehensively controls operations of the respective units in the camera main body 200, e.g., the mechanical shutter 201, the imaging element 202, and the display driver 213. Further, the microcomputer 215 also executes AE processing by using subject luminance calculated by the AE processing unit 207 or AF processing by using an AF evaluation value calculated by the AF processing unit 208. Furthermore, at the time of attaching the interchangeable lens 100, the microcomputer 215 also controls operations of the interchangeable lens 100. Moreover, the microcomputer 215 in this embodiment also has a function as a timing acquisition unit. Specifically, the microcomputer 215 acquires information indicative of a timing at which a release button 2161 of the operation unit 216 has been fully pressed by a user during moving image shooting, i.e., an execution instruction of still image shooting has been issued (which will be referred to as release timing hereinafter).

The operation unit 216 corresponds to various operation members operated by a user. The operation unit 216 in this embodiment includes the release button 2161, a moving image recording button 2162, a menu button 2163, a reproduction button 2164, and a power supply button 2165. Here, part or all of these buttons may be configured as virtual operation units operated through a touch panel.

The release button 2161 comprises a two-stage switch including a first (1st) release switch and a second (2nd) release switch. When the release button 2161 has been half pressed and the first release switch has been turned on, the microcomputer 215 executes shooting preparation processing, e.g., the AE processing and the AF processing. Moreover, when the release button 2161 has been fully pressed and the second release switch has been turned on, the microcomputer 215 executes the still image shooting processing. In this manner, the release button 2161 functions as an example of a still image shooting instruction unit that instructs the micro computer 215 to execute still image shooting.

The moving image recording button 2162 functions as an example of the moving image shooting instruction unit that instructs the microcomputer 215 to execute moving image shooting. When the moving image recording button 2162 has been pressed, the microcomputer 215 executes moving image shooting processing. Additionally, when the moving image recording button 2162 has been pressed during execution of the moving image shooting processing, the microcomputer 215 terminates the moving image shooting processing.

The menu button 2163 is an operation unit which instructs to display a menu screen. In the menu screen, a user can change various kinds of settings of the camera main body 200. The reproduction button 2164 is an operation unit that instructs the microcomputer 215 to reproduce a still image file or a moving image file. The power supply button 2165 is an operation unit that instructs to turn on or off a power supply of the camera main body 200.

The flash memory 217 stores various parameters required for operations of the camera main body 200, e.g., parameters required for operations of the image processing unit 209 such as a white balance gain for white balance correction, a color matrix coefficient for color matrix calculation, a gamma table for gamma conversion, and others. The flash memory 217 in this embodiment also stores a table for setting a combining coefficient used in special effect image processing. Further, the flash memory 217 also stores various programs executed by the microcomputer 215.

The face detection unit 218 detects an image of a facial region in image data by using feature amount matching and the like and outputs information indicative of a range of the detected facial region (a facial range) to the microcomputer 215.

Operations of the digital camera shown in FIG. 1 will now be described hereinafter. FIG. 2 is a flowchart showing a main operation of the digital camera depicted in FIG. 1. The operation in FIG. 2 is performed when, e.g., the power supply of the digital camera depicted in FIG. 1 has been turned on.

After the power supply of the digital camera has been turned on, the microcomputer 215 executes initialization processing (step S101). In the initialization processing, the microcomputer 215 executes processing, e.g., changing a recording flag set in a register thereof to OFF. The recording flag is a flag indicating whether a moving image is being recorded or not. When the recording flag is OFF, this means that a moving image is not being recorded. On the other hand, when the recording flag is ON, this means that a moving image is being recorded.

Then, the microcomputer 215 determined whether the reproduction button 2164 of the operation unit 216 has been pressed by a user (step S102). If the reproduction button 2164 has been pressed in the determination at the step S102, the microcomputer 215 executes reproduction processing (step S103).

In the reproduction processing, the microcomputer 215 waits for an image file (a still image file or a moving image file) to be selected by a user. Further, if the image file has been selected, the microcomputer 215 decodes the selected image file by using the image compression/expansion unit 210. Furthermore, the microcomputer 215 inputs image data obtained by decoding the selected image file to the display driver 213. The display driver 213 converts the input image data into a video signal and displays an image associated with this video signal in the display unit 214. Thereafter, if the user has issued a reproduction terminating instruction, for example, if the reproduction button 2164 has been pressed again, the microcomputer 215 returns the processing to the step S102.

Moreover, if the reproduction button has not been pressed in the determination at the step S102, the microcomputer 215 determines whether the menu button 2163 in the operation unit 216 has been pressed by the user (step S104). If the menu button 2163 has been pressed in the determination at the step S104, the microcomputer 215 controls the display driver 213, displays a menu screen in the display unit 214, and then executes camera setting processing (step S105).

In the camera setting processing, the microcomputer 215 waits for a camera setting change instruction from the user. Additionally, if any camera setting change instruction has been issued, the microcomputer 215 changes the camera setting in accordance with this instruction. In this camera setting processing, for example, an image recording mode at the time of shooting a still image or shooting a moving image is changed. Further, in the camera setting processing, whether later-described special effect image processing is to be executed can be also changed.

Furthermore, if the menu button 2163 has not been pressed in the determination at the step S104, the microcomputer 215 determines whether the moving image recording button 2162 in the operation unit 2162 has been pressed by the user (step S106). If the moving image recording button 2162 has been pressed in the determination at the step S106, the microcomputer 215 reverses the recording flag (step S107). That is, the microcomputer 215 changes the recording flag to ON if this flag is OFF or changes the recording flag to OFF if this flag is ON. Then, the microcomputer 215 determines whether a moving image is currently being recorded, i.e., whether the recording flag is ON (step S108).

If the recording flag is ON in the determination at the step S108, the microcomputer 215 generates a moving image file and records the generated moving image file in the recording medium 212 (step S109). The moving image file has a header information recording portion and a moving image recording portion. Moving file header information is recorded in a header information portion. As this header information, a file name, shooting information (ISO sensitivity, an aperture value, a shooting date and time, and others) at the time of shooting a moving image, pointer information required for specifying a position of each of pieces of image data constituting a moving image data, and others can be used. Further, in this embodiment, as the header information, still image information and timing information are recorded. Detail of the still image information and the timing information will be described later. Moreover, the moving image data is recorded in a compressed state in the moving image recording portion.

If the moving image recording button 2162 has not been pressed in the determination at the step S106, or if the recording flag is not ON in the determination at the step S108, a moving image file is generated at the step S109, and then the microcomputer 215 determines whether a moving image is currently being recorded, i.e., whether the recording flag is ON (step S110). If the recording flag is OFF in the determination at the step S110, the microcomputer 215 determines whether the release button 2161 in the operation unit 216 has been half pressed by the user and the state of the release button 2161 has changed from the OFF state to the ON state of the 1st release switch (step S111). If the state of the release button 2161 has changed to the ON state of the 1st release switch in the determination of the step S111, the microcomputer 215 executes the face detection processing, the AE processing, and the AF processing (step S112).

In the face detection processing, the microcomputer 215 allows the face detection unit 218 to detect a face range.

In the AE processing, the microcomputer 215 allows the AE processing unit 207 to calculate subject luminance. Then, the microcomputer 215 determines ISO sensitivity, an aperture value, and a shutter speed in execution of still image shooting in accordance with the subject luminance calculated by the AE processing unit 207. It is to be noted that, in the AE processing, the ISO sensitivity, the aperture value, and the shutter speed may be determined so that a specific facial region can have adequate luminance.

In the AF processing, the microcomputer 215 allows the AF processing unit 208 to acquire an AF evaluation value. Furthermore, the microcomputer 215 evaluates contrast in image data based on the AF evaluation value acquired by the AF processing unit 208 and instructs the lens microcomputer 104 to drive a focus lens of the lens 101 in small steps. Then, the microcomputer 215 instructs the lens microcomputer 104 to stop driving of the focus lens when the contrast becomes maximum. Such AF processing is AF processing adopting a so-called contrast scheme. As the AF processing, phase difference AF processing may be used. It is to be noted that, in the AF processing, the focus lens may be driven so that a specific facial range can be focused.

Here, the face detection processing, the AE processing, and the AF processing in the example shown in FIG. 2 are executed at the timing that the state of the release button 2161 changes to the ON state of the 1st release switch. That is, at the timing that the state of the release button does not change to the ON state of the 1st release switch, e.g., when the OFF state of the release button continues, when the ON state of the 1st release switch continues, or when the ON state of a later-described 2nd release switch continues, the face detection processing, the AE processing, and the AF processing are not executed.

If the state of the release button 2161 has not changed to the ON state of the 1st release switch in the determination at the step S111, the microcomputer 215 determines whether the release button 2161 in the operation unit 216 has been fully pressed by the user and the state of the release button 2161 has changed to the ON state of the 2nd release switch (step S113).

If the state of the release button has been the ON state of the 2nd release switch in the determination at the step S113, the microcomputer 215 executes still image shooting processing (step S114). Therefore, the microcomputer 215 sets a gain control amount (an amplification factor) in the analog processing unit 203 in accordance with the ISO sensitivity determined at the step S112 and transmits the aperture value determined at the step S112 to the lens microcomputer 104. Then, the microcomputer 215 synchronizes driving of the diaphragm 102 under control of the lens microcomputer 104, operates the mechanical shutter 201 in accordance with the shutter speed determined at the step S112, and controls an exposure amount of the imaging element 202. Based on such still image shooting processing, image data is stored in the RAM 206.

After the still image shooting processing is executed, the microcomputer 215 uses the image processing unit 209 to execute image processing with respect to the image data stored in the RAM 206 by the still image shooting processing, thereby generating still image data (step S115). At this time, if execution of the special effect image processing is set in advance, both the basic image processing effected by the basic image processing unit 2091 and the special effect image processing effected by the special effect image processing 2092 are executed with respect to the image data. On the other hand, if execution of the special effect image processing is not set in advance, the basic image processing effected by the basic image processing unit 2091 alone is executed with respect to the image data.

After the image processing, the microcomputer 215 executes processing for recording as a still image file still image data stored in the RAM 206 as a result of the image processing (step S116). At this time, the microcomputer 215 instructs the image compression/expansion unit 210 to execute still image compression processing with respect to the still image data stored in the RAM 206 as a result of the still image shooting processing. In response to this instruction, the image compression/expansion unit 210 executes the still image compression processing to cope with a preset recording mode and stores the compressed still image data in the RAM 206. Thereafter, the microcomputer 215 reads the still image data compressed by the image compression/expansion unit 210 from the RAM 206, adds predetermined header information to the read still image data, creates a still image file, and records the created still image file in the recording medium 212. The still image file has a header information recording portion and a still image recording portion. Still image file header information is recorded in the header information portion. As this header information, a file name, shooting information at the time of still image shooting (ISO sensitivity, an aperture value, a shooting date and time, and others), and others are recorded. Still image data is recorded in a compressed state in the still image recording portion.

Moreover, if the state of the release button is not the ON state of the 2nd release switch in the determination at the step S113, the microcomputer 215 executes the AE processing (step S117). This AE processing is processing for live view display. After the AE processing, the microcomputer 215 executes shooting processing for live view display (step S118). In this shooting processing, the microcomputer 215 operates an electronic shutter function of the imaging element 202 in accordance with the shutter speed determined by the AE processing and controls an exposure amount of the imaging element 202. After the shooting processing, the microcomputer 215 uses the image processing unit 209 to execute the image processing with respect to the image data stored in the RAM 206 as a result of the shooting processing (step S119). After the image processing, the microcomputer 215 instructs the display driver 213 to reproduce the image data stored in the RAM 206 as a result of the image processing. In response to this instruction, the display driver 213 reads the image data from the RAM 206, converts the read image data into a video signal, and outputs this signal to the display unit 214. The display unit 214 reproduces an image based on this video signal (step S120). Based on such live view display, the user can perform, e.g., confirmation of a composition by using the display unit 214.

Additionally, if the recording flag is ON in the determination at the step S110, the microcomputer 215 executes moving image shooting processing (step S121). Detail of the moving image shooting processing will be described later.

Further, after the steps S112, S116, S120, and S121, the microcomputer 215 determines whether the power supply of the digital camera has been turned off (step S122). If the power supply of the digital camera has not been turned off in the determination at the step S122, the microcomputer 215 executes processing at the step S102 and the subsequent steps. On the other hand, if the power supply of the digital camera is turned off in the determination at the step S122, the microcomputer 215 terminates the processing in FIG. 2.

FIG. 3 is a flowchart showing the detail of the moving image shooting processing in this embodiment. In FIG. 3, a description will be given on the assumption that execution of the special effect image processing is set in the camera setting processing.

In the moving image shooting processing, the microcomputer 215 executes the face detection processing and the AE processing (step S201). Then, the microcomputer 215 determines whether the state of the release button 2161 has changed from the OFF state to the ON state of the 1st release switch (step S202). If the state of the release button 2161 has been changed to the ON state of the 1st release switch in the determination at the step S202, the microcomputer 215 executes the AF processing (step S203). Further, if the state of the release button 2161 has not been changed to the ON state of the 1st release switch, the microcomputer 215 skips the processing of the step S203.

Then, the microcomputer 215 executes the shooting processing (step S204). In this shooting processing, like the imaging processing for live view display, the microcomputer 215 operates the electronic shutter function of the imaging element 202 in accordance with the shutter speed determined by the AE processing and controls an exposure amount of the imaging element 202. Thereafter, the microcomputer 215 uses the image processing unit 209 to execute the image processing with respect to the image data stored in the RAM 206 as a result of the imaging processing (step S205). At the step S205, the basic image processing is executed with respect to the image data.

Subsequently, the microcomputer 215 determines whether the state of the release button 2161 has changed the ON state of the 2nd release switch (step S206). If the state of the release button 2161 has changed the ON state of the 2nd release switch in the determination at the step S206, the microcomputer 215 stores still image information at that time in, e.g., the RAM 206 (step S207).

The still image information is accompanying information concerning image data of a frame immediately before the timing (release timing) that the release button 2161 has been fully pressed during the moving image shooting. In this embodiment, for example, image data itself of a frame immediately before the release timing is stored as still image information. This stored image data is obtained during the moving image shooting, but is processed as one piece of still image data. This stored image data will be referred to as still image data in a moving image hereinafter.

Further, information indicative of a position in an image focused in the AF processing immediately before the release button timing (which will be referred to as AF information hereinafter) may be stored as still image information. Furthermore, information representing a specific facial range (which will be referred to as facial information hereinafter) obtained by the face detection processing immediately before release timing can be stored as still image information. Further, various kinds of information that enable identifying a main subject in still image data in a moving image can be stored as still image information.

After the still image information is stored, the microcomputer 215 acquires timing information indicative of the release timing (step S208). The timing information is, e.g., an elapsed time from start of the moving image shooting processing to the release timing or a clock time indicative of the release timing. Further, a frame number of image data in a moving image file associated with still image data in a moving image or information indicative of a position of image data associated with still image data in a moving image from a top of a moving image file (pointer information) may be determined as timing information.

After the timing information is acquired, the microcomputer 215 executes special effect image processing, live view display processing, and recording processing, respectively (step S209). Then, the microcomputer 215 terminates the processing in FIG. 3 and executes the processing at the step S122 in FIG. 2 and subsequent steps.

Figure 4:
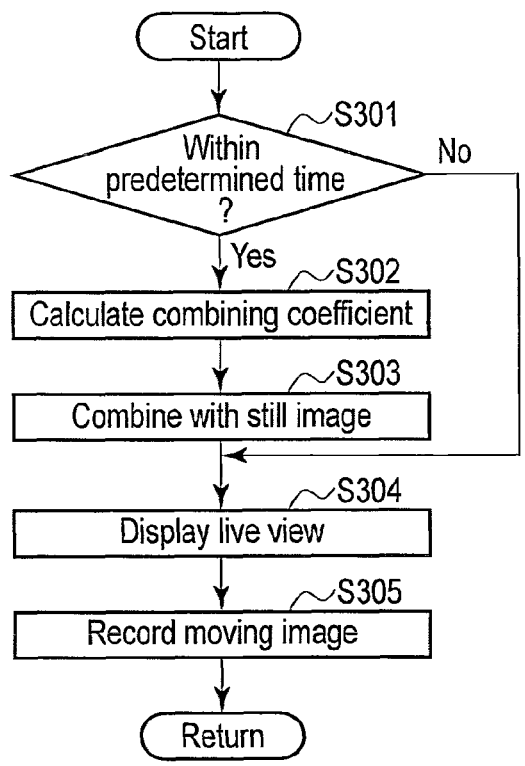
FIG. 4 is a flowchart showing an example of processing of step S209 in FIG. 3 in the first embodiment according to the present invention.

FIG. 4 is a flowchart showing an example of the processing at the step S209 in FIG. 3 according to the first embodiment. In FIG. 4, the microcomputer 215 determines whether a time difference between acquisition timing of image data of a frame which is a current target of moving image shooting (a current frame) and release timing indicated by timing information, i.e., an elapsed time from the release timing is a predetermined time T (e.g., within 3 seconds) (step S301). If the timing information is a frame number or pointer information, whether a positional difference of the image data in a moving image file is within a predetermined value is determined.

If the time difference between the acquisition timing of the image data of the current frame and the release timing indicated by the timing information is not within the predetermined time in the determination at the step S301, the microcomputer 215 skips processing of step S302 and step S303. In this case, the special effect image processing is not executed with respect to the image data of the current frame.

On the other hand, if the time difference between the acquisition timing of the image data of the current frame and the release timing indicated by the timing information is within the predetermined time in the determination at the step S301, the microcomputer 215 calculates a combining coefficient in accordance with a table stored in the flash memory 217 (step S302). After the combining coefficient is calculated, the microcomputer 215 combines (superimposes) the still image data in a moving image stored in the RAM 206 as the still image information with the image data of the current frame by using the image processing unit 209 and stores image data obtained by combination in the RAM 206 as new image data of the current frame (step S303).

If the time difference between the acquisition timing of the image data of the current frame and the release timing indicated by the timing information is not within the predetermined time at the step S301, or after the step S303, the microcomputer 215 instructs the display driver 213 to execute live view display of an image based on the image data of the current frame stored in the RAM 206 (step S304). When the combined image data obtained by the above combination has been reproduced, the display unit 214 displays an image having an afterimage effect in a state that the still image in a moving image obtained in accordance with the release timing is superimposed on the image of the current frame which should be reproduced this time.

Subsequently, the microcomputer 215 adds the image data of the current frame stored in the RAM 206 to the moving image file created in advance at the step S109 in FIG. 2 (step S305). After the image data of the current frame has been added to the moving image file, the microcomputer 215 terminates the processing in FIG. 4. At the step S305, the microcomputer 215 instructs the image compression/expansion unit 210 to execute the moving image compression processing with respect to the image data of the current frame stored in the RAM 206. In response to this instruction, the image compression/expansion unit 210 executes the image compression processing in accordance with the preset recording mode and stores the compressed image data in the RAM 206. Then, the microcomputer 215 reads the compressed image data from the RAM 206 and adds the read image data to the moving image recording portion in the previously created moving image file.

Figure 5:
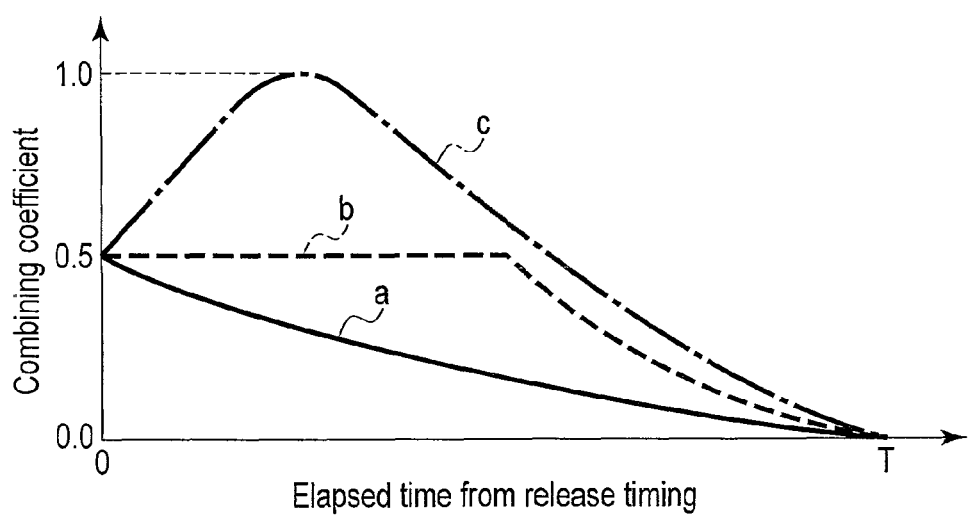
FIG. 5 is a view showing an example of a setting table of a combining coefficient in the first embodiment according to the present invention.

FIG. 5 is a view showing an example of the combining coefficient setting table used for calculating the combining coefficient at the step S302. As shown in FIG. 5, the combining coefficient is set in the range of 0.0 to 1.0. Further, it is desirable to set the combining coefficient in such a manner that the combining coefficient becomes 0.0 when a predetermined time T has passed from a time point immediately after the release timing (a time point of 0 in the drawing).

FIG. 5 shows an example of the combining coefficient table meeting such two conditions. For example, table characteristics of "a" in FIG. 5 are characteristics that the combining coefficient is reduced to 0.0 over the predetermined time T. Furthermore, table characteristics of "b" in FIG. 5 are characteristics that the combining coefficient is constant over a given time period and is then reduced to 0.0. Moreover, table characteristics of "c" in FIG. 5 are characteristics that the combining coefficient is increased to 1.0 and then reduced to 0.0. In this manner, the combining coefficient tables having various characteristics can be set in advance. The microcomputer 215 uses the tables previously stored as shown in FIG. 5 and calculates the combining coefficient associated with the time difference from the release timing. It is to be noted that if more than one characteristic table is stored, a user may set which one of the tables is to be used.

FIG. 6 is a view for explaining an example of the combination processing of the step S303. FIG. 6 shows an example where the combination was executed in accordance with the following (Expression 1).

$$C = \alpha \times A + B \quad \text{(Expression 1)}$$

where A in (Expression 1) is a value of a still image data in a moving image, B in the same is a value of image data of a current frame, α in the same is a combining coefficient, and C in the same is a value of image data after combination. Moreover, the combining coefficient α in the example shown in FIG. 6 is associated with the characteristics a in FIG. 5.

As described above, when the release button 2161 is fully pressed during a series of moving image shooting, image data of a previous frame is stored as still image data in a moving image. Then, combination is carried out until a predetermined time which is T seconds (e.g., 3 seconds) passes from the release timing. When the still image data in a moving image is combined in accordance with (Expression 1), the translucent still image in a moving image is superimposed on an image of the current frame, and pieces of combined image data C1, C2, and C3 shown in FIG. 6 are generated.

When the combining coefficient table has the characteristics a in FIG. 5, the combining coefficient α is reduced with time. Therefore, the combined image data C2 has higher transparency of the still image data in a moving image to be combined than the combined image data C1. Further, the still image data in a moving image becomes completely transparent when the predetermined time T (3 seconds) has passed. The combined image data C3 obtained at this moment is image data equivalent to data when no combination processing is carried out.

In the above example, the transparency of the still image data in a moving image alone is changed and combined in accordance with (Expression 1). However, in this embodiment, the still image data in a moving image may be combined with the image data of the current frame by an arbitrary method. For example, both pieces of data may be combined in accordance with the following (Expression 2).

$$C = \alpha \times A + (1 - \alpha) \times B \quad \text{(Expression 2)}$$

in the case of (Expression 2), translucency processing is executed with respect to the still image data in a moving image and the image data of the current frame, and these pieces of data are combined.

Additionally, when facial information is stored as the still image information, image data of a facial range in the still image data in a moving image alone may be combined as shown in FIG. 6. In this case, the image processing unit 209 extracts image data in the facial range specified by the facial information from the still image data in the moving image and combines the extracted image data in the facial range with the image data of the current frame. A combining position of the image data in the facial range in this case is not restricted in particular. For example, this position may be a fixed position, may be a subject position (a facial range) in the image data of the current frame, or may be appropriately set by a user. Additionally, the image data may be extracted by using AF information in place of the facial information.

Further, as shown in FIG. 6, the image data of the facial range in the still image data in the moving image may be enlarged and then combined. It is desirable to set an enlargement factor in this case in such a manner that the enlarged image data in the facial range can be fitted within a viewing angle of the image data of the current frame. Furthermore, the user may be able to set the enlargement factor. Moreover, the user may be able to set whether the image data of the facial range in the still image data in the moving image can be enlarged and then combined.

As described above, according to this embodiment, when the user fully presses the release button 2161 at a desired timing during the moving image shooting, the combining processing as the special effect image processing is executed with respect to the image data associated with this timing. In this manner, according to this embodiment, the user can carry out the special effect image processing at an intended timing during the moving image shooting without performing, e.g., editing after the moving image shooting.

Further, at the time of executing the combining processing as the special effect image processing, a combining coefficient of still image data in a moving image is changed in accordance with an elapsed time from the release timing and then set to zero after a predetermined time, whereby a precipitous change in image at the time of reproduction can be suppressed and a natural afterimage effect can be exerted.

Here, according to the first embodiment, the timing for acquiring still image data in a moving image is the timing at which the release button 2161 is fully pressed. The operation unit that specifies this timing may be any unit other than the release button 2161.

Second Embodiment

A second embodiment according to the present invention will now be described. The second embodiment is an example of executing special effect image processing different from that in the first embodiment. In the second embodiment, as the special effect image processing, processing for changing a reproduction time of a moving image associated with each timing before or after release timing is executed.

In the second embodiment, a description on the same parts as those in the first embodiment will be omitted. In this embodiment, a storage region for an image buffer is provided in a RAM 206. This storage region for the image buffer is provided separately from a storage region for storing still image data or moving image data. The storage region for the image buffer is a storage region for holding image data of a past frame in later-described special effect image processing.

Figure 7:
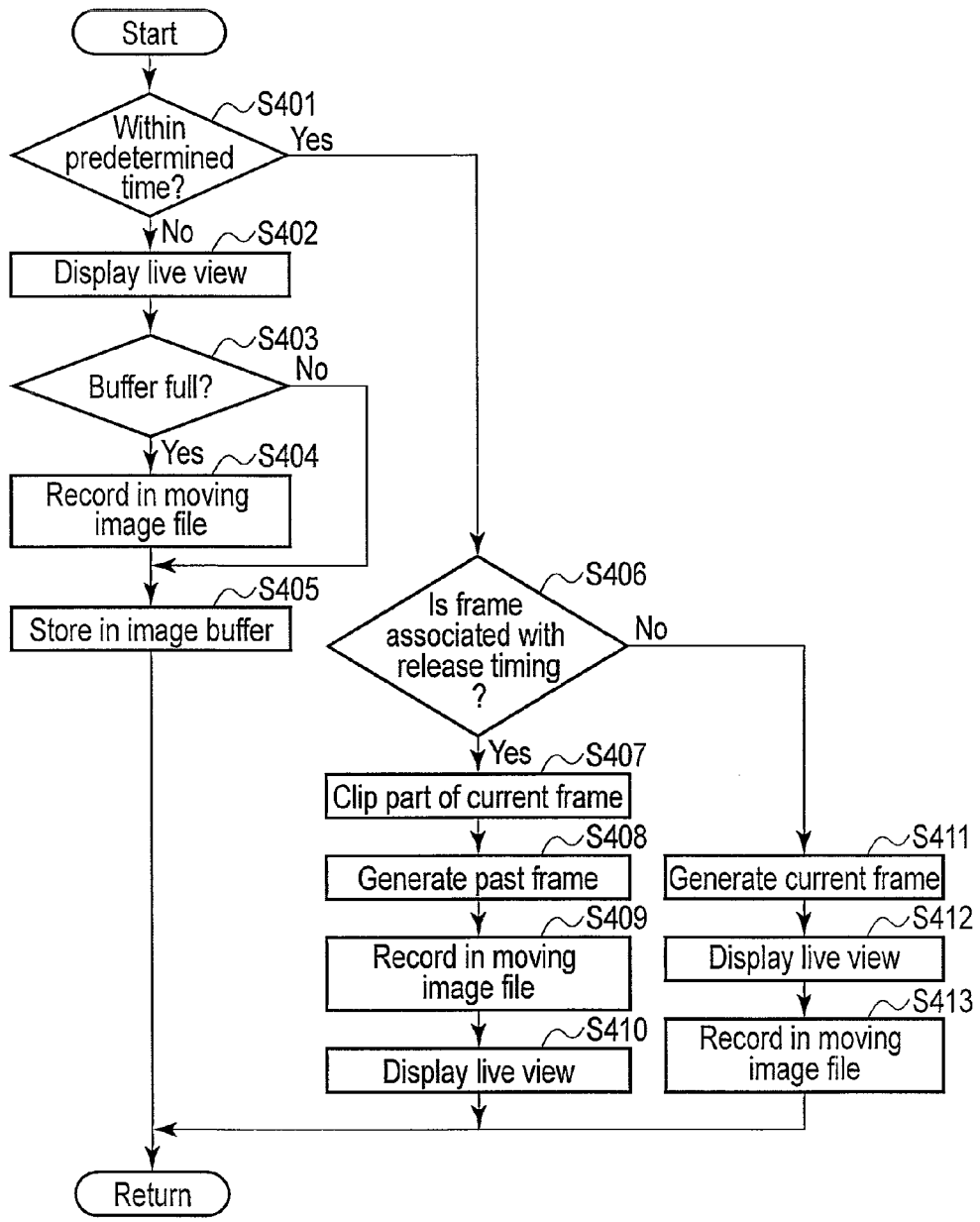
FIG. 7 is a flowchart showing an example of processing of step S209 in FIG. 3 in a second embodiment according to the present invention.

FIG. 7 is a flowchart showing an example of processing at step S209 in FIG. 3 according to the second embodiment. In FIG. 7, a microcomputer 215 determines whether a time difference between acquisition timing of image data of a frame (a current frame) which is a current target of moving image shooting and release timing indicated by timing information, i.e., an elapsed time from the release timing is a predetermined time T (e.g., within 3 seconds) (step S401). If the time difference between the acquisition timing of the image data of the current frame and the release timing indicated by the timing information is not within the predetermined time in the determination at the step S401, the microcomputer 215 instructs the display driver 213 to perform live view display of an image based on the image data of the current frame stored in the RAM 206 (step S402).

Subsequently, the microcomputer 215 determines whether an image buffer is full (step S403). If the image buffer is full in the determination at the step S403, the microcomputer 215 adds image data recorded in the image buffer to a moving image file previously created at step S109 in FIG. 2 (step S404). Then, the microcomputer 215 stores the image data of the current frame in the image buffer configured in the RAM 206 (step S405). Furthermore, if the image buffer is not full in the determination at the step S403, the microcomputer 215 skips the processing of the step S404.

At the step S404, the pieces of image data recorded in the image buffer are sequentially recorded in the moving image file in chronological order. For example, it is assumed that the image buffer has a capacity that enables storing seven pieces of image data. In this case, until the seventh piece of image data is stored, the pieces of image data are sequentially stored as shown in FIG. 8A. On the other hand, in regard to eighth and subsequent pieces of image data, as shown in FIG. 8B, the oldest image data is added to the moving image file and then stored. When the pieces of image data are cyclically stored in the image buffer as shown in FIG. 8B, the pieces of image data can be sequentially stored even though the capacity of the image buffer is small.

Furthermore, if the time difference between the acquisition timing for the image data of the current frame and the release timing indicated by the timing information is within the predetermined time in the determination at the step S401, the microcomputer 215 determines whether the image data of the current frame is image data of a frame associated with the release timing (step S406). If the image data of the current frame is the image data of the frame associated with the release timing in the determination at the step S406, the microcomputer 215 clips part (e.g., a facial range or an AF range) of the image data of the current frame by using an image processing unit 209 (step S407). Further, the microcomputer 215 uses an image of the clipped part of the image data and executes generation processing of image data of a past frame as the special effect image processing in the second embodiment (step S408). This generation processing of image data of a past frame will be described later.

After the image data of the past frame is generated, the microcomputer 215 adds the image data of the past frame generated at the step S408 to a moving image file previously created at the step S109 in FIG. 2 (step S409). After the image data of the past frame is added to the moving image file, the microcomputer 215 instructs the display driver 213 to perform live view display of an image based on the generated image data of the past frame (step S410). Then, the microcomputer 215 terminates the processing shown in FIG. 7.

Further, if the image data of the current frame is not the image data of the frame associated with the release timing in the determination at the step S406, the microcomputer 215 uses the image of the part of the image data clipped by the image processing unit 209 and executes generation processing of image data of a new current frame as the special effect image processing in the second embodiment (step S411). This generation processing of image data of a current frame will be also described later.

After the image data of the current frame is generated, the microcomputer 15 instructs the display driver 213 to perform live view display of an image based on the generated image data of the current frame (step S412). Then, the microcomputer 215 adds the image data of the current frame generated at the step S411 to the moving image file previously created at the step S109 in FIG. 2 (step S413). After the image data of the current frame is added to the moving image file, the microcomputer 215 terminates the processing shown in FIG. 7.

Figure 9:
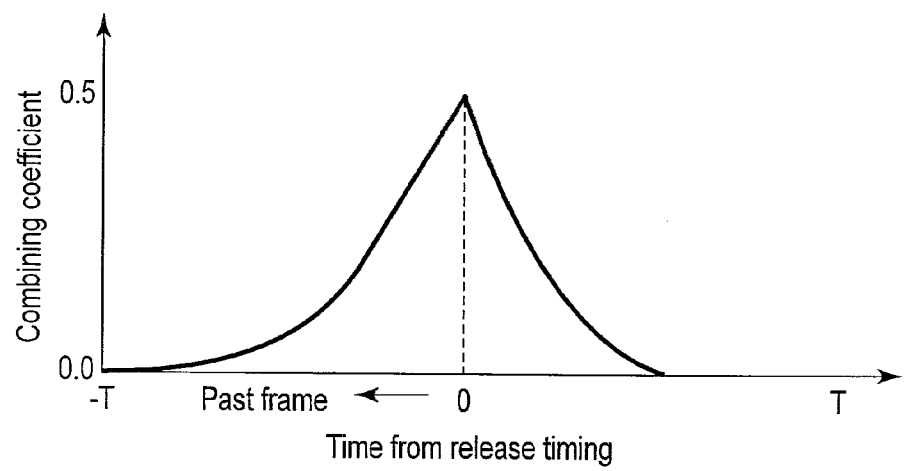
FIG. 9 is a view showing an example of a setting table of a combining coefficient in the second embodiment according to the present invention.

The frame generation processing as the special effect image processing in the second embodiment will now be described hereinafter. FIG. 9 is a view showing an example of a combining coefficient setting table for frame generation at the step S408 or S411.

As shown in FIG. 9, the combining coefficient in the second embodiment is set in the range of 0.0 to 1.0 like the first embodiment. Moreover, in the second embodiment, the combining coefficient is set to fall within the range of a predetermined time T before or after the release timing (a time point 0 in the drawing). Additionally, the combining coefficient in the second embodiment is set in such a manner that the combining coefficient becomes 0.0 at each time point that is ±1 from the release timing. If these conditions are met, characteristics of the combining coefficient may be arbitrarily set. The example shown in FIG. 9 corresponds to characteristics that the combining coefficient monotonously increases from 0.0 to 0.5 from the time point of −T to the time point of 0 and then decreases to 0.0 before the time point of T.

Further, in this embodiment, a reproduction speed of moving image data in the range of the predetermined time T before or after the release timing is changed. At this time, it is desirable to set the reproduction speed to an actual speed (a onefold speed). Furthermore, it is further desirable to change the reproduction speed in such a manner that the number of frames reduced by high-speed reproduction processing can coincide with the number of frames increased by low-speed reproduction processing so that a reproduction time for an entire moving image can remain the same.

Figure 10:
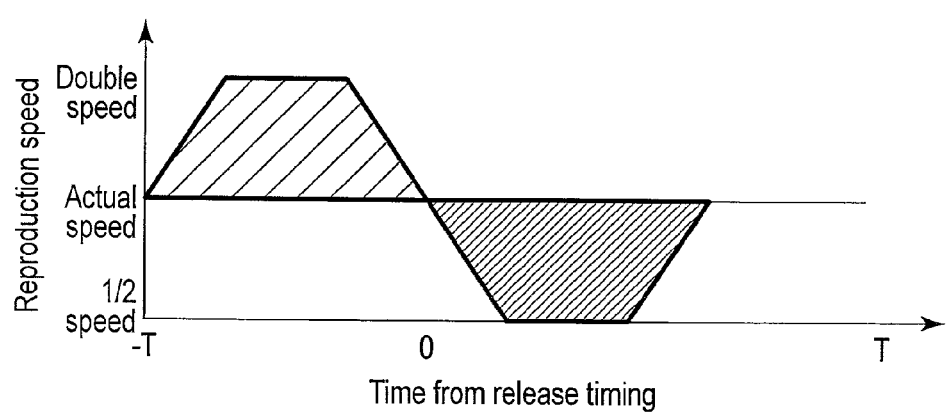
FIG. 10 is a view showing an example of variation characteristics of a reproduction speed.

FIG. 10 is a view showing an example of variation characteristics of a reproduction speed. FIG. 10 shows an example that a reproduction speed is changed from an actual speed to double speed, then changed from double speed to ½, and again changed to the actual speed. In the case of changing the reproduction speed as shown in FIG. 10, a region where high-speed reproduction processing is executed (an area of a region above an actual speed line in the drawing) can be set equal to a region where low-speed reproduction processing is executed (an area of a region below the actual speed line in the drawing). As a result, the number of frames reduced by the high-speed reproduction coincides with the number of frames increased by the low-speed reproduction.

FIG. 11 is a view for explaining generation of a past frame at the step S408. First, still image data in a moving image produced from image data (m) associated with release timing is combined with each of pieces of image data (m−6) to (m−1) stored in an image buffer. Further, the still image data in a moving image is also combined with the image data (m) associated with the release timing. A combining method is the same as that in the first embodiment. That is, part of the still image data in a moving image (e.g., a facial range) is clipped, and a viewing angle of an image of the clipped part is enlarged. Furthermore, the enlarged image of the part of the still image data in a moving image is combined with image data as a combination target in accordance with a combining coefficient associated with a time difference from such release timing as shown in FIG. 9. It is needless to say that, like the first embodiment, these pieces of image data may be combined without enlarging the viewing angle of the image of the part of the still image data in a moving image, i.e., with the unchanged viewing angle.

The image buffer is overwritten with respective pieces of combined image data (m−6) to (m−1) obtained by the combining processing of the still image data in a moving image to store these pieces of data. Moreover, a storage region different from the image buffer in the RAM 206 is overwritten with the combined image data (m) to store this data. Subsequently, image data after changing a reproduction speed is generated to change the reproduction speed. If a reproduction time of image data corresponding to one frame is not changed, reducing the number of pieces of image data to be reproduced can suffice in order to increase the reproduction speed, and increasing the number of pieces of image data to be reproduced can suffice in order to lower the reproduction speed. For example, at the time of reproducing pieces of image data of continuous frames, the pieces of image data of these frames can be combined and then reproduced, or they can be thinned out and then reproduced, thereby increasing the reproduction speed. Contrarily, at the time of reproducing pieces of image data of continuous frames, the image data of an intermediate frame in the continuous frames can be further reproduced, or the image data of the same frame can be reproduced more than once, thereby reducing the reproduction speed.

In the case of generating moving image data having such reproduction speed characteristics as shown in FIG. 10 from the image data stored as shown in FIG. 11, the combined image data (m−6) is reproduced at an actual speed. Therefore, no processing is applied to the combined image data (m−6).

Subsequently, the pieces of combined image data (m−5) and (m−4) and the pieces of combined image data (m−3) and (m−2) are reproduced at double speed. Therefore, the combined image data (m−5) and the combined image data (m−4) are further combined, and post-reproduction-speed-change image data (m−5) is generated. Moreover, the combined image data (m−3) and the combined image data (m−2) are further combined, and post-reproduction-speed-change image data (m−4) is generated. A combining ratio of the combined image data in the combining processing is, e.g., 1:1. When two frames which are the pieces of post-reproduction-time-change image data (m−5) and (m−4) are reproduced in place of reproducing four frames which are the pieces of combined image data (m−5) to (m−2), the reproduction speed becomes the double speed. Here, as the high-speed processing, the example of further combining the pieces of combined image data corresponding to two frames has been explained, but one of the two frames may be thinned out.

Then, the combined image data (m−1) is reproduced at the actual speed. Therefore, no processing is applied to the combined image data (m−1), and post-reproduction-speed-change image data (m−3) is provided. The subsequent combined image data (m) is reproduced at the ½ speed. Therefore, the combined image data (m) is copied, and pieces of post-reproduction-speed-change image data (m−2) and (m−1) are generated. When the pieces of post-reproduction-speed image data (m−2) and (m−1) which are the same image data are continuously reproduced, the reproduction speed becomes the ½ speed. As the low-speed processing, the processing for copying the same combined image data has been described, and combined image data of an intermediate frame of two frames may be newly generated.

The processing from the beginning to the generation of the post-reproduction-speed-change image data (m−1) using the combined image data (m) is the past frame generation processing. After such past frame generation processing, the combined image data stored in the image buffer is erased. Then, until a predetermined time T passes, the generation processing for a current frame at the step S411 is executed every time new image data is acquired by the moving image shooting. The generation processing of a current frame will now be described with reference to FIG. 12.

At the next moving image shooting timing for combined image data (m), image data (m+1) is obtained. First, still image data in a moving image is combined with the image data (m+1), and combined image data (m+1) is generated. The RAM 206 is overwritten with this combined image data (m+1). The combined image data (m+1) is reproduced at a ½ speed. Therefore, the combined image data (m+1) is copied, and pieces of post-reproduction-speed-change image data (m) and (m+1) are generated.

Thereafter, pieces of post-reproduction-speed-change image data (m+2), (m+3), and (m+4) are sequentially generated so that the reproduction speed can be restored to the actual speed. As shown in FIG. 12, the post-reproduction-speed-change image data (m+2) is combined image data (m+2). Further, the post-reproduction-speed-change image data (m+3) is combined image data of an intermediate frame of the combined image data (m+2) and combined image data (M+3). Furthermore, the post-reproduction-speed-change image data (m+4) is combined image data (m+4).

Although not shown in FIG. 12, pieces of combined image data (m+5) and (m+6) can be also obtained until the predetermined time T passes. These pieces of data are reproduced at the actual speed.

As described above, according to the present invention, when a user fully presses the release button 2161 at a desired timing during the moving image shooting, the reproduction speed change processing as the special effect image processing can be executed with respect to image data at each timing before or after this timing. As described above, in this embodiment, likewise, a user can execute the special effect image processing at an intended timing during moving image shooting without performing, e.g., editing after the moving image shooting.

Additionally, when the post-reproduction-speed-change image data is generated so that the reproduction speed can be restored to the actual speed at the end of the special effect image processing, a precipitous change in reproduction speed before and after execution of the special effect image processing can be suppressed.

Here, in the second embodiment, the still image data in a moving image is combined, and then the reproduction speed change processing is executed. Contrarily, the reproduction speed change processing may be executed, and then the still image data in a moving image may be combined. Furthermore, in the second embodiment, the combining processing for the still image data in a moving image may be omitted. In this case, the still image data in a moving image does not have to store as still image information.

Furthermore, in the above example, the processing for changing the processing speed to the double speed or the ½ speed is executed. However, the reproduction speed does not necessarily have to be changed to the double speed or the ½ speed, and it can be arbitrarily set. For example, when pieces of combined image data corresponding to three frames are combined and reproduced, the reproduction speed can be changed to a triple speed. Contrarily, when the same combined image data is continuously reproduced three times, the reproduction speed can be changed to a ⅓ speed. When the high-speed processing for changing the reproduction speed to the triple speed is executed, it is desirable to interpolate the three frames reduced by this processing with use of the lower-speed processing.

Third Embodiment

A third embodiment according to the present invention will now be described. The third embodiment is an example of executing special effect image processing different from that in the first and second embodiments. In this third embodiment, as the special effect image processing, image data is processed in accordance with a gain map. This special effect image processing includes processing for adding shading, processing for changing saturation, processing for adding blurring, soft focus processing, and others.

In the third embodiment, a description on the same parts as those in the first and second embodiments will be omitted. FIG. 13 is a flowchart showing an example of the processing at the step S209 in FIG. 3 according to the third embodiment. In FIG. 13, a microcomputer 215 determines whether a time difference between acquisition timing for image data of a frame which is a current target of moving image shooting (a current frame) and release timing indicated by timing information, i.e., an elapsed time from the release timing is a predetermined time T (e.g., within 3 seconds) (step S501). If the time difference between the acquisition timing for the image data of the current frame and the release timing indicated by the timing information is within the predetermined time in the determination at the step S501, the microcomputer 215 creates a gain map for special effect image processing in the third embodiment (step S502). The gain map creation processing will be described later. After the gain map is created, the microcomputer 215 executes the special effect image processing.

Further, if the time difference between the acquisition timing for the image data of the current frame and the release timing indicated by the timing information is not within the predetermined time in the determination at the step S501, the microcomputer 215 skips the processing of the step S502 and the step S503.

If the time difference between the acquisition timing for the image data of the current frame and the release timing indicated by the timing information is not within the predetermined time in the determination at the step S501, or after the special effect image processing has been executed at the step S503, the microcomputer 215 instructs a display driver 213 to execute live view display of an image based on image data stored in a RAM 206 as a result of the special effect image processing (step S504). Then, the microcomputer 215 adds the image data stored in the RAM 206 as a result of the special effect image processing to a moving image file previously created at the step S109 in FIG. 2 (step S505). Thereafter, the microcomputer 215 terminates the processing in FIG. 13.

FIG. 14 is a view showing an example of a gain map created at the step S502. The gain map is a table in which each position in an image is associated with a coefficient specified by contents of the special effect image processing. This coefficient is a gain value that is multiplied by image data to add, e.g., shading in the case of shading adding processing, or a gain value that is multiplied by, e.g., a color difference signal (CbCr) in the case of saturation changing processing, or a value associated with a filter coefficient that determines, e.g., a degree of blurring in the case of soft focus processing and blurring adding processing.

The gain map table shown in FIG. 14 has characteristics that a coefficient at a center position specified by still image information is 1 and the coefficient is reduced to 0 in accordance with a distance from the center position. The center position is assumed to be a center position in a facial range specified by facial information or a center position in an AF range specified by AF information.

Moreover, as shown in FIG. 14, as the gain map table in this embodiment, a gain map table having characteristics that differ depending on an elapsed time from the release timing is provided. The gain map table shown in FIG. 14 is set in such a manner that the coefficient becomes closer to 1 the longer the elapsed time is from the release timing.

Figure 15:
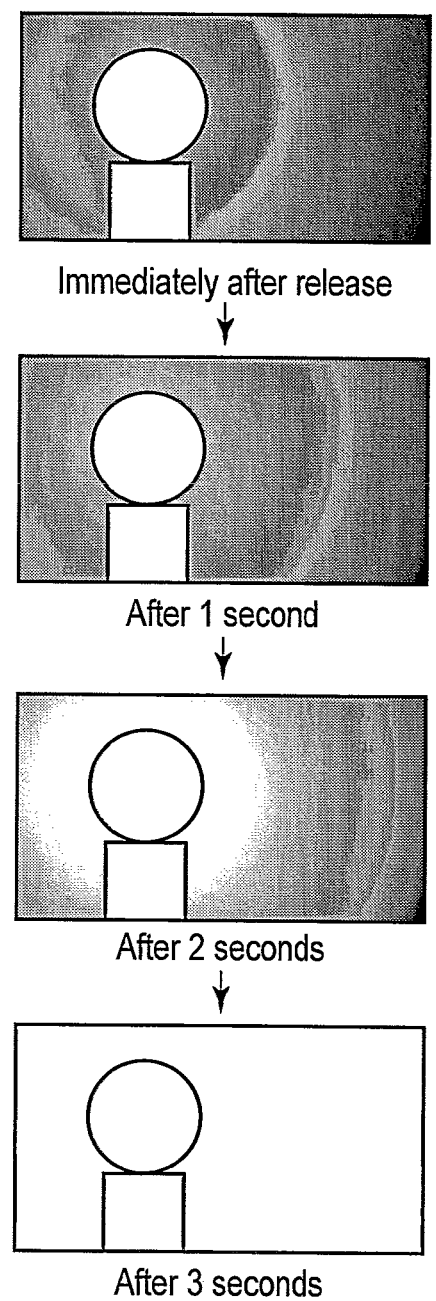
FIG. 15 is a view showing an example when processing for adding shading is performed in accordance with the gain map depicted in FIG. 14.

In this embodiment, the gain map table associated with the elapsed time from the release timing is sequentially selected, and the special effect image processing is executed. FIG. 15 is a view showing an example when processing for adding shading is executed in accordance with the gain map shown in FIG. 14. As shown in FIG. 15, in the same image, the image becomes darker as a distance from a position near the center position (a facial range in the example shown in FIG. 15) becomes longer. Furthermore, the image becomes brighter as a whole as an elapsed time from the release timing becomes longer, and the image enters a state that is the same level as that the processing for adding shading is not executed when a predetermined time T (e.g., 3 seconds) has elapsed.

Additionally, although not shown, when saturation changing processing has been executed, in the same image, a saturation correction color matrix is set in such a manner that the saturation is lowered as a distance from a position near the center position becomes longer. Further, in the case of soft focus processing, a coefficient of a low-pass filter is set in such a manner that a degree of blur increases as a distance from a position near the center position becomes longer.

Further, in the case of processing for adding blurring, blurring processing based on the gain map shown in FIG. 14 is executed with respect to a region in image data where the coefficient is 1, i.e., a region associated with a facial range or an AF range. In this case, the facial range (the AF range) portion in the image has a clear image, and any other portion has a blurry image. When such blurring processing is executed, it is possible to obtain such an image having the special effect added thereto as an image acquired by diorama shooting.

As described above, according to this embodiment, when a user fully presses the release button 2161 at a desired timing during moving image shooting, the special effect image processing that provides a visual effect, which differs depending on a time elapsed from the release timing, is applied to image data associated with the timing. As described above, in this embodiment, likewise, the user can execute the special effect image processing at an intended timing during the moving image shooting without performing, e.g., editing after the moving image shooting.

In the third embodiment, the combining processing described in the first embodiment or the reproduction speed change processing described in the second embodiment may be also used.

Furthermore, in the third embodiment, the gain map used for executing the special effect image processing is created in accordance with the facial information or the AF information as the still image information. Further, for example, when subject luminance is used as the still image information, the coefficient of the gain map can be changed in accordance with the subject luminance.

Fourth Embodiment

A fourth embodiment according to the present invention will now be described. In each of the first to third embodiments, the example that the special effect image processing is executed during moving image shooting has been described. On the other hand, the fourth embodiment provides an example that the special effect image processing is executed during reproduction of a moving image.

In the fourth embodiment, a description on the same parts as those in the first to third embodiments will be omitted. FIG. 16 is a flowchart showing detail of moving image shooting processing in this embodiment. Processing of each of steps S201 to S206 in FIG. 16 is the same as that in FIG. 3. Therefore, a description will be omitted.

If a state of a release button 2161 is an ON state of a 2nd release switch in a determination at the step S206, a microcomputer 215 stores still image information at this moment in, e.g., a RAM 206 (step S607). The still image information is basically the same as that in the first embodiment. In the fourth embodiment, as the still image information, special effect reproduction information indicative of whether the special effect image processing is to be executed or not is further recorded.

After storing the still image information, the microcomputer 215 acquires timing information indicative of release timing (step S608). The microcomputer 215 records, as a still image file, still image data stored as the still image information (still image data in a moving image) at the step S607 (step S609). Subsequently, the microcomputer 215 adds image data of a current frame stored in the RAM 206 to a moving image file previously created at the step S109 in FIG. 2 (step S610). The timing information is recorded in, e.g., a header information portion in the moving image file in advance. The timing information may be also recorded in a header information portion in the still image file. After the end of recording the image data in the moving image file, the microcomputer 215 terminates the processing in FIG. 16 and executes processing at the step S122 and subsequent steps in FIG. 2.

As described above, in this embodiment, the still image information and the timing information are recorded in place of executing the special effect image processing at the time of moving image shooting.

Figure 17:
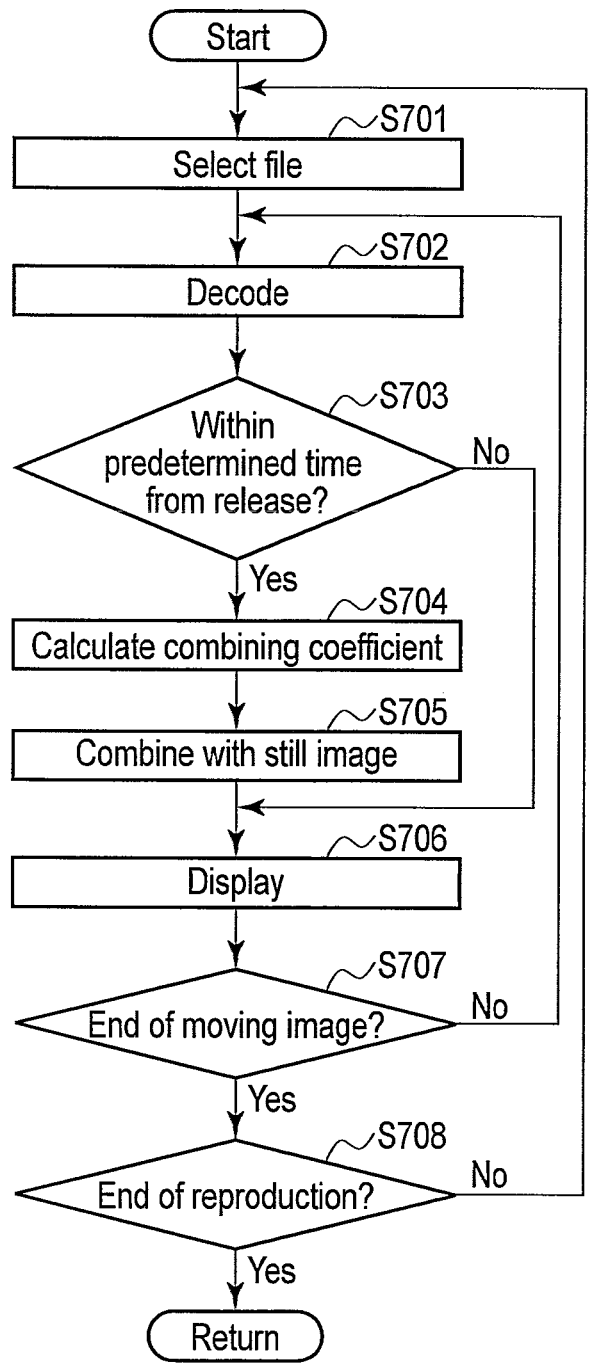
FIG. 17 is a flowchart showing detail of moving image reproduction processing in the fourth embodiment according to the present invention.

FIG. 17 is a flowchart showing moving image reproduction processing in this embodiment. This processing in FIG. 17 is executed at the time of the reproduction processing of the step S103 in FIG. 2. As described above, in this embodiment, the special effect image processing is executed at the time of reproduction of an operation. In this embodiment, when information indicating that the special effect image processing is to be executed is recorded as special effect reproduction information, the special effect image processing is executed.

Additionally, FIG. 17 shows an example that the combining processing explained in the first embodiment is executed as the special effect image processing. The special effect image processing described in each of the second embodiment and the third embodiment may be executed.

In the reproduction processing in FIG. 17, the microcomputer 215 waits for a user to select a moving image file (step S701). Further, when a moving image file has been selected, the microcomputer 215 decodes the selected moving image file by using an image compression/expansion unit 210 (step S702).

Furthermore, the microcomputer 215 determines whether a time difference between acquisition timing for an image data of a frame which is a current reproduction target and release timing indicated by timing information, i.e., an elapsed time from the release timing is a predetermined time T (e.g., within 3 seconds) (step S703). If the time difference between the acquisition timing for the image data of the current frame and the release timing indicated by the timing information is within the predetermined time in the determination at the step S703, the microcomputer 215 calculates a combining coefficient in accordance with a table stored in a flash memory 217 (step S704). After calculating the combining coefficient, the microcomputer 215 combines (superimposes) the still image data in a moving image recorded in the still image file by using the image processing unit 209 and the image data of the current frame and stores image data obtained by the combination in the RAM 206 as image data of a new current frame (step S705).

If the time difference between the acquisition timing for the image data of the current frame and the release timing indicated by the timing information is not within the predetermined time at the step S703, or after the step S705, the microcomputer 215 instructs a display driver 213 to display an image based on the image data of the current frame stored in the RAM 206 (step S706).

After reproducing the image data of the current frame, the microcomputer 215 determines whether reproduction of the selected moving image has been completed, i.e., whether reproduction of the image data of all frames constituting the moving image data has been completed (step S707). If reproduction of the moving image has not been completed in the determination at the step S707, the microcomputer 215 executes processing at step S702 and subsequent steps to reproduce image data of a next frame. Moreover, if reproduction of the moving image has been completed in the determination at the step S707, the microcomputer 215 determines whether the moving image reproduction processing is to be terminated, i.e., whether an instruction for terminating reproduction has been issued (step S708). If the moving image reproduction processing is not to be terminated in the determination at the step S708, the microcomputer 215 executes the processing at the step S701 and subsequent steps. On the other hand, if the moving image reproduction processing is to be terminated in the determination at the step S708, the microcomputer 215 terminates the processing in FIG. 17 and executes the processing at the step S101 and subsequent steps in FIG. 2.

As described above, according to this embodiment, even if the special effect image processing has not been executed at the time of shooting a moving image, the moving image subjected to the special effect image processing can be reproduced at the time of reproduction. Even in this case, a user does not have to be conscious of an editing operation.

This embodiment shows the example that the digital camera 10 executes both the processing in FIG. 16 and the processing in FIG. 17. The moving image shooting processing in FIG. 16 may be executed in the digital camera 10, and the processing in FIG. 17 may be executed in the special effect image processing apparatus different from the digital camera 10. FIG. 18 shows a configuration of such a modification. In the example of FIG. 18, an image processing unit 209 in a digital camera 10 as an example of an image apparatus does not include a special effect image processing unit 2092. Instead, an interface (I/F) 219 that enables communication with a special effect image processing apparatus 20 is provided to a camera main body 200. Further, the special effect image processing apparatus 20 includes an image compression/expansion unit 301 and a special effect image processing unit 302. The image compression/expansion unit 301 has the same function as an image compression/expansion unit 210. Furthermore, the special effect image processing unit 302 has the same function as a special effect image processing unit 2092.

In the example of FIG. 18, a camera main body 200 of the digital camera 10 is directly connected to the special effect image processing apparatus 20 in the drawing, but the I/F 219 may be a wireless interface. Further, the technology of this embodiment can be applied to various cases in which a moving image file (including moving image information and timing information) can be transmitted or received between the camera main body 200 and the special effect image processing apparatus 20. For example, if a recording medium 212 is configured to be attachable to or detachable from the camera main body 200, the technology of this embodiment can be applied to even a conformation in which the recording medium 212 having a moving image file recorded therein is taken out from the camera main body 200 and the moving image file in this taken out recording medium 212 is read out and processed by the special effect image processing apparatus 20.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
an imaging unit which images a subject and obtains image data;
an image processing unit which performs image processing with respect to the image data obtained by the imaging unit;
a still image shooting instruction unit configured to instruct the imaging unit to execute still image shooting;
a still image information storage unit which stores still image information including: still image data obtained by using the image processing unit to perform image processing to the image data acquired by the imaging unit in accordance with an instruction from the still image shooting instruction unit; and accompanying information of the still image data;
a moving image shooting instruction unit configured to instruct the imaging unit to execute moving image shooting;
a moving image recording unit which records moving image data obtained by using the image processing unit to perform image processing to the pieces of image data obtained by the imaging unit in accordance with an instruction from the moving image shooting instruction unit; and
a timing information acquisition unit which acquires timing information indicative of a timing at which an executing instruction of the still image shooting was issued when the still image shooting instruction unit has instructed to execute the still image shooting during execution of the moving image shooting,
wherein the image processing unit performs special effect image processing, which is configured to execute processing of superimposing the still image data to a part of image data associated with the timing information in pieces of image data constituting the moving image data, with respect to the moving image data during execution of the moving image shooting based on the still image information stored in the still image information storage unit and the timing information acquired by the timing information acquisition unit,
wherein the moving image recording unit further records moving image data subjected to the special effect image processing during execution of the moving image shooting,
wherein the image processing unit performs processing of adding shading with respect to the still image data as the special effect image processing,
wherein the accompanying information includes AF information, and
wherein the image processing unit performs the processing of adding shading so that an AF center of the still image data indicated by the AF information is a center position of the processing of adding shading.

2. The apparatus according to claim 1,
wherein the image processing unit performs processing of changing a superimposing ratio of the still image data to be superimposed in accordance with an elapsed time from the timing and setting the superimposing ratio to zero after a fixed time with respect to the moving image data as the superimposing processing.

3. The apparatus according to claim 1,
wherein the image processing unit determines both a viewing angle of the image data associated with the timing information and a viewing angle of the still image data as the same viewing angle and superimposes the still image data with the image data associated with the timing information.

4. The apparatus according to claim 1,
wherein the image processing unit superimposes the still image data with the image data associated with the timing information with a viewing angle of an image of the subject recorded in the still image data, which has been increased to be higher than a viewing angle of an image of the subject recorded in the image data associated with the timing information.

5. The apparatus according to claim 4,
wherein the accompanying information includes face detection information of the subject, and
the image processing unit superimposes the still image data with the image data associated with the timing information with a viewing angle of an image of the subject recorded in the still image data, which has been increased to be higher than a viewing angle of an image of a facial region of the still image data indicated by the face detection information.

6. The apparatus according to claim 1,
wherein the image processing unit performs processing of changing a reproduction speed of image data that temporally precedes or follows the image data associated with the timing information in the pieces of image data constituting the moving image data as the special effect image processing.

7. The apparatus according to claim 1,
wherein the accompanying information includes face detection information of the subject, and
the image processing unit performs the processing of adding shading so that an image of a facial region of the subject recorded in the still image data indicated by the face detection information is a center position of the processing of adding shading.

8. The apparatus according to claim 1,
wherein the accompanying information further includes special effect reproducing information indicating whether the special effect image processing is to be executed to the moving image data reproduced at the time of reproduction of the moving image data, and
the image processing unit performs the special effect image processing to the moving image data when the special effect reproducing information is indicative of execution of the special effect image processing.

9. The apparatus of claim 1, further comprising a special effect image processing unit to which the still image information and the timing information obtained are input and which performs special effect image processing with respect to moving image data based on the input still image information and timing information.

10. An imaging apparatus comprising:
an imaging unit which images a subject and obtains image data;
an image processing unit which performs image processing with respect to the image data obtained by the imaging unit;
a still image shooting instruction unit configured to instruct the imaging unit to execute still image shooting;
a still image information storage unit which stores still image information including: still image data obtained by using the image processing unit to perform image processing to the image data acquired by the imaging unit in accordance with an instruction from the still image shooting instruction unit; and accompanying information of the still image data;
a moving image shooting instruction unit configured to instruct the imaging unit to execute moving image shooting;
a moving image recording unit which records moving image data obtained by using the image processing unit to perform image processing to the pieces of image data obtained by the imaging unit in accordance with an instruction from the moving image shooting instruction unit; and
a timing information acquisition unit which acquires timing information indicative of a timing at which an executing instruction of the still image shooting was issued when the still image shooting instruction unit has instructed to execute the still image shooting during execution of the moving image shooting,
wherein the image processing unit performs special effect image processing, which is configured to execute processing of superimposing the still image data to a part of image data associated with the timing information in pieces of image data constituting the moving image data, with respect to the moving image data during execution of the moving image shooting based on the still image information stored in the still image information storage unit and the timing information acquired by the timing information acquisition unit,
wherein the moving image recording unit further records moving image data subjected to the special effect image processing during execution of the moving image shooting,
wherein the image processing unit performs processing of adding blurring with respect to the still image data as the special effect image processing,
wherein the accompanying information includes AF information, and
wherein the image processing unit performs the processing of adding blurring to a region excluding an AF center in the still image data indicated by the AF information.

11. The apparatus according to claim 10,
wherein the accompanying information includes face detection information of the subject, and
the image processing unit performs the processing of adding blurring to a region of the subject excluding an image of a facial region of the subject recorded in the still image data indicated by the face detection information.

12. The apparatus according to claim 10,
wherein the image processing unit performs processing of changing a superimposing ratio of the still image data to be superimposed in accordance with an elapsed time from the timing and setting the superimposing ratio to zero after a fixed time with respect to the moving image data as the superimposing processing.

13. The apparatus according to claim 10,
wherein the image processing unit determines both a viewing angle of the image data associated with the timing information and a viewing angle of the still image data as the same viewing angle and superimposes the still image data with the image data associated with the timing information.

14. The apparatus according to claim 10,
wherein the image processing unit superimposes the still image data with the image data associated with the timing information with a viewing angle of an image of the subject recorded in the still image data, which has been increased to be higher than a viewing angle of an image of the subject recorded in the image data associated with the timing information.

15. The apparatus according to claim 14,
wherein the accompanying information includes face detection information of the subject, and
the image processing unit superimposes the still image data with the image data associated with the timing information with a viewing angle of an image of the subject recorded in the still image data, which has been increased to be higher than a viewing angle of an image of a facial region of the still image data indicated by the face detection information.

16. The apparatus according to claim 10,
wherein the image processing unit performs processing of changing a reproduction speed of image data that temporally precedes or follows the image data associated with the timing information in the pieces of image data constituting the moving image data as the special effect image processing.

17. The apparatus according to claim 10,
wherein the accompanying information further includes special effect reproducing information indicating whether the special effect image processing is to be executed to the moving image data reproduced at the time of reproduction of the moving image data, and
the image processing unit performs the special effect image processing to the moving image data when the special effect reproducing information is indicative of execution of the special effect image processing.

18. The apparatus according to claim 10, further comprising a special effect image processing unit to which the still image information and the timing information obtained are input and which performs special effect image processing with respect to moving image data based on the input still image information and timing information.

19. An imaging method comprising:
instructing an imaging unit to execute moving image shooting by a moving image shooting instruction unit;
imaging a subject and obtaining pieces of image data by the imaging unit in accordance with an instruction from the moving image shooting instruction unit;
performing image processing with respect to the pieces of image data obtained by the imaging unit and acquiring moving image data by an image processing unit;
instructing the imaging unit to execute still image shooting by a still image shooting instruction unit during execution of the moving image shooting;
storing still image data obtained by using the image processing unit to perform the image processing to the image data acquired by the imaging unit and accompanying information of the still image data in a still image data storage unit in accordance with an instruction from the still image shooting instruction unit, wherein the accompanying information includes AF information;
obtaining timing information indicative of a timing at which an execution instruction of the still image shooting was issued by a timing information acquisition unit in accordance with an instruction from the still image shooting instruction unit;
performing special effect image processing, which is configured to superimpose the still image data with a part of image data associated with the timing information in the pieces of image data constituting the moving image data, by the image processing unit with respect to the moving image data during execution of the moving image shooting based on the still image information stored in the still image information storage unit and the timing information acquired by the timing information acquisition unit;
recording moving image data subjected to the special effect image processing in a moving image recording unit during execution of the moving image shooting; and
adding shading with respect to the still image data as the special effect image processing, wherein the act of adding shading is performed so that an AF center of the still image data indicated by the AF information is a center position of the processing of adding shading.

20. An imaging method comprising:
instructing an imaging unit to execute moving image shooting by a moving image shooting instruction unit;
imaging a subject and obtaining pieces of image data by the imaging unit in accordance with an instruction from the moving image shooting instruction unit;
performing image processing with respect to the pieces of image data obtained by the imaging unit and acquiring moving image data by an image processing unit;
instructing the imaging unit to execute still image shooting by a still image shooting instruction unit during execution of the moving image shooting;
storing still image data obtained by using the image processing unit to perform the image processing to the image data acquired by the imaging unit and accompanying information of the still image data in a still image data storage unit in accordance with an instruction from the still image shooting instruction unit, wherein the accompanying information includes AF information;
obtaining timing information indicative of a timing at which an execution instruction of the still image shooting was issued by a timing information acquisition unit in accordance with an instruction from the still image shooting instruction unit;
performing special effect image processing, which is configured to superimpose the still image data with a part of image data associated with the timing information in the pieces of image data constituting the moving image data, by the image processing unit with respect to the moving image data during execution of the moving image shooting based on the still image information stored in the still image information storage unit and the timing information acquired by the timing information acquisition unit;
recording moving image data subjected to the special effect image processing in a moving image recording unit during execution of the moving image shooting; and
adding blurring with respect to the still image data as the special effect image processing, wherein the act of adding blurring adds blurring to a region excluding an AF center in the still image data indicated by the AF information.

\* \* \* \* \*